(12) United States Patent
Costinett et al.

(10) Patent No.: US 12,347,602 B2
(45) Date of Patent: Jul. 1, 2025

(54) SELF-RESONANT COIL WITH SERIES LC RESONANCE AND ELECTRIC FIELD CANCELATION

(71) Applicant: University of Tennessee Research Foundation, Knoxville, TN (US)

(72) Inventors: Daniel Jes Costinett, Knoxville, TN (US); Jie Li, Knoxville, TN (US); Ruiyang Qin, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 18/862,336

(22) PCT Filed: May 2, 2023

(86) PCT No.: PCT/US2023/020689
§ 371 (c)(1),
(2) Date: Nov. 1, 2024

(87) PCT Pub. No.: WO2023/215286
PCT Pub. Date: Nov. 9, 2023

(65) Prior Publication Data
US 2025/0118481 A1    Apr. 10, 2025

Related U.S. Application Data

(60) Provisional application No. 63/337,494, filed on May 2, 2022.

(51) Int. Cl.
*H01F 27/28* (2006.01)
*H01F 27/32* (2006.01)
(Continued)

(52) U.S. Cl.
CPC ..... *H01F 27/2804* (2013.01); *H01F 27/2885* (2013.01); *H01F 27/323* (2013.01);
(Continued)

(58) Field of Classification Search
CPC .............. H01F 27/2804; H01F 27/2885; H01F 27/323; H01F 27/36; H01F 27/40; H01F 2027/2809; H02J 50/12; H02J 50/70
(Continued)

(56) References Cited

U.S. PATENT DOCUMENTS 9,490,656 B2 * 11/2016 Kurz ................. H02J 50/12
9,859,052 B2 *  1/2018 Kurz ................. H01F 27/2852
(Continued)

FOREIGN PATENT DOCUMENTS

CN    108270078 B    8/2020
GB      2533695 A    6/2016

OTHER PUBLICATIONS

International Search Report and Written Opinion corresponding to International Patent Application No. PCT/US2023/020689 dated Sep. 8, 2023.
(Continued)

*Primary Examiner* — Alfonso Perez Borroto
(74) *Attorney, Agent, or Firm* — Jenkins, Taylor & Hunt, P.A.

(57) ABSTRACT

A coil structure for near-field wireless power transfer, integrating the traditional inductor and external capacitor structure into one single coil and forming a series resonance. The series resonance is achieved by a terminal connection and layering method. The electric field is canceled via a distributed turn-to-turn interleaving structure. With the integrated capacitor, the costs and space of a resonant capacitor can be saved. With the canceled electric field, the interference with neighboring components, such as touch-screen, can be reduced. Other benefits can include low-profile and fabrication convenience based on RGB technology. This coil can be useful for both consumer electronics and electric vehicle wireless charging.

20 Claims, 24 Drawing Sheets

(51) Int. Cl.
  *H01F 27/36*   (2006.01)
  *H01F 27/40*   (2006.01)
  *H02J 50/12*   (2016.01)
  *H02J 50/70*   (2016.01)

(52) U.S. Cl.
  CPC .............. *H01F 27/36* (2013.01); *H01F 27/40* (2013.01); *H02J 50/12* (2016.02); *H02J 50/70* (2016.02); *H01F 2027/2809* (2013.01)

(58) Field of Classification Search
  USPC ........................................................ 307/104
  See application file for complete search history.

(56) References Cited

U.S. PATENT DOCUMENTS

| | | | |
|---|---|---|---|
| 10,003,218 | B2 | 6/2018 | Yang et al. |
| 10,389,181 | B1* | 8/2019 | Grundmann ............ H04B 5/26 |
| 11,996,229 | B2* | 5/2024 | Costinett ................. H04B 5/79 |
| 2014/0340031 | A1 | 11/2014 | Mi et al. |
| 2016/0126001 | A1* | 5/2016 | Chien ..................... H01F 27/34 336/200 |
| 2017/0025899 | A1* | 1/2017 | Misawa ............. H02M 3/3376 |
| 2018/0062441 | A1* | 3/2018 | Maniktala ................. H02J 7/04 |
| 2019/0081517 | A1* | 3/2019 | Graham ................... G01K 7/22 |
| 2020/0090855 | A1 | 3/2020 | Yu et al. |
| 2021/0193381 | A1 | 6/2021 | Costinett et al. |

OTHER PUBLICATIONS

Arabsalmanabadi et al. (2021) "A Three-Dimensional Discontinuous Galerkin Time-Domain Finite Element Method for Electromagnetic Modeling of Wireless Power Transfer Coils," IEEE Open Journal of the Industrial Electronics Society, vol. 2, pp. 360-371.

Chan, P.C.F., et al., "Stray Capacitance Calculation of Coreless Planar Transformers Including Fringing Effects," Electronics Letters, vol. 43, No. 23, 2007, 3 Pages.

Ferrite Shield Data Sheet, Wurth Elektronik, [Online] Available: https://www.we-online.com/katalog/datasheet/364003.pdf, 4 Pages.

International Preliminary Report on Patentability corresponding to International application No. PCT/US2023/020689 dated Nov. 14, 2024, 11 Pages.

Jeong, N.S., et al., "Wireless Charging of a Metal-body Device," IEEE Transactions on Microwave Theory and Techniques, vol. 65, No. 04, 2017, pp. 1077-1086.

Jeong, N.S., et al., "Wireless Charging of a Metal-encased Device," IEEE Transactions on Antennas and Propagation, vol. 70, No. 01, 2022, pp. 654-663.

Kim, J.H., et al., "Method to Reduce Metal Plate Effect Between Transmitter and Receiver in Wireless Power Transfer System," IEEE Antennas and Wireless Propagation Letters, vol. 17, No. 04, 2018, pp. 587-590.

Li, J., et al., "Analysis and Design of a Series Self-resonant Coli for Wireless Power Transfer," In 2018 IEEE Applied Power Electronics Conference and Exposition (APEC), IEEE, 2018, pp. 1052-1059.

Li, J., et al., "Systematic Design of a 100-W 6.78-MHz Wireless Charging Station Covering Multiple Devices and A Large Charging Area," IEEE Transactions on Power Electronics, vol. 37, No. 04, 2022, pp. 4877-4889. [cited in PCT Specification].

Mohan, S.S., et al., "Simple Accurate Expressions for Planar Spiral Inductances," IEEE Journal of Solid-State Circuits, vol. 34, No. 10, 1999, pp. 1419-1424.

Qin, R., et al., "A 6.6-KW High-frequency Wireless Power Transfer System for Electric Vehicle Charging using Multilayer Nonuniform Self-resonant Coil at MHz," IEEE Transactions on Power Electronics, vol. 37, No. 04, 2022, pp. 4842-4856.

Stein, A.L.F., et al., "High-Q Self-resonant Structure for Wireless Power Transfer," 2017 IEEE Applied Power Electronics Conference and Exposition (APEC), 2017, pp. 3723-3729.

Sullivan, C. R., et al., "Design Methodology for a High-Q Self-resonant Coil for Medical and Wireless-Power Applications," in 14th Workshop on Control and Modeling for Power Electronics (COMPEL), IEEE, 2013, pp. 1-8.

* cited by examiner

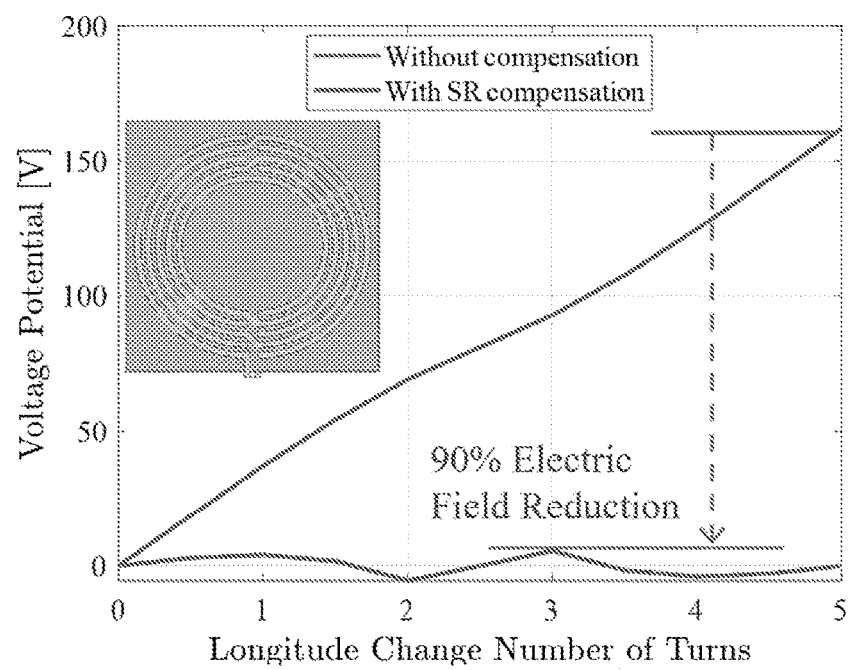
FIG. 19
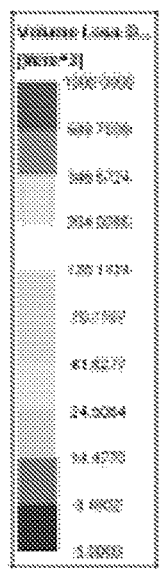 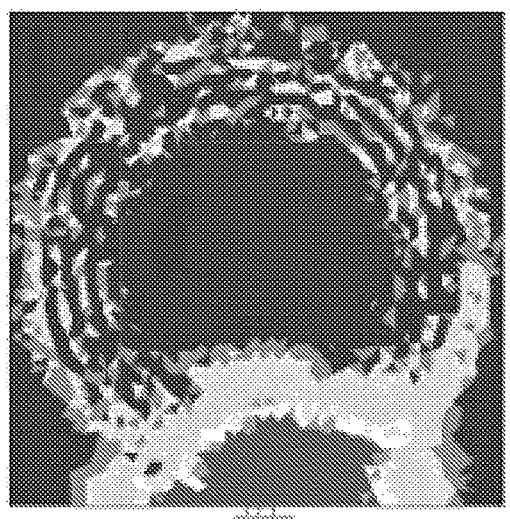 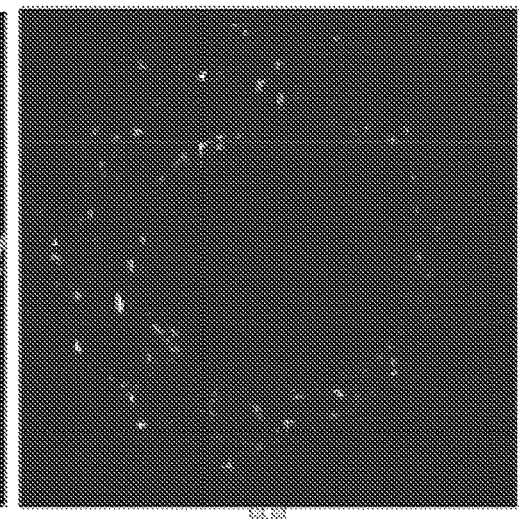
FIG. 20A    FIG. 20B    FIG. 20C TABLE I. Comparison of the measured and calculated circuit parameters.

| Parameters | Design | FEA | Measurement |
|---|---|---|---|
| FSRC resonance $f_{2,s}$ with shield (MHz) | 6.63 | 6.6 (-0.5%) | 6.61 (-0.3%) |
| FSRC inductance $L_{2,s}$ with shield ($\mu$H) | 1.60 | 1.54 (-3.8%) | 1.56 (-2.5%) |
| FSRC capacitance $C_{2,s}$ (pF) | 360 | 378 (+5%) | 372 (+5.7%) |
| FSRC ESR $R_{2,s}$ ($\Omega$) | 0.19 | 0.23 (+21%) | – |
| FSRC resonance $f_{2,s}$ w/o shield (MHz) | 8.12 | 8.10 (-0.12%) | 8.19 (-0.86%) |
| FSRC inductance $L_{2,ns}$ w/o shield ($\mu$H) | 1.07 | 1.02 (-4.7%) | 1.03 (-3.7%) |
| FSRC capacitance $C_{2,ns}$ w/o shield (pF) | 360 | 380 (+5.6%) | 370 (+3.3%) |
| FSRC ESR $R_{2,ns}$ w/o shield ($\Omega$) | 0.19 | 0.20 (+5.3%) | 0.18 (-5.3%) |

FIG. 20D

TABLE II. COMPARISON OF MEASURED AND CALCULATED CIRCUIT PARAMETERS

| Parameters | Variable | Design | Measure |
|---|---|---|---|
| Transmitter input voltage (V) | $V_{dc}$ | 200 | 201 (+0.5%) |
| Transmitter input power (W) | $P_{in}$ | 107.69 | 108.54 (+0.37%) |
| 1st receiver output voltage (V) | $V_{o,1}$ | 31.5 | 31.1 (-1.3%) |
| 1st receiver output power (V) | $P_{o,1}$ | 50 | 47.93 (-4.1%) |
| New receiver output voltage (V) | $V_{o,2}$ | 31.5 | 32.1 (+1.9%) |
| New receiver output power (W) | $P_{o,2}$ | 50 | 52.68 (-5.4%) |

FIG. 20E

SELF-RESONANT COIL WITH SERIES LC RESONANCE AND ELECTRIC FIELD CANCELATION

RELATED APPLICATIONS

This application is a U.S. National Phase Application of PCT International Patent Application No. PCT/US2023/020689, filed May 2, 2023, incorporated herein by reference in its entirety, and which claims priority to and the benefit of U.S. Provisional Patent Application Ser. No. 63/337,494, filed May 2, 2022; the disclosure of which is incorporated herein by reference in its entirety.

TECHNICAL FIELD

The presently disclosed subject matter relates to series self-resonant coil structures for wireless power transfer.

BACKGROUND

Wireless power transfer, also known as wireless charging or wireless energy transfer, is a technology that allows electrical devices to be powered without the need for a physical connection between the power source and the device. This technology is becoming increasingly popular in consumer electronics such as smartphones, smartwatches, and earbuds, as it eliminates the need for cables and connectors, making it more convenient for users.

The basic principle of wireless power transfer is based on the transfer of energy through a magnetic field between two coils, one in the transmitter and the other in the receiver. The transmitter generates a magnetic field that induces an electrical current in the receiver coil, which is then rectified and used to power the device or charge a battery. The efficiency and range of wireless power transfer systems depend on various factors such as the size and geometry of the coils, the distance between the transmitter and receiver, and the frequency and modulation of the magnetic field. Advances in wireless power transfer technology are driving the development of new applications in areas such as electric vehicles, medical implants, and industrial automation.

SUMMARY

A coil structure for near-field wireless power transfer, integrating the traditional inductor and external capacitor structure into one single coil and forming a series resonance. The series resonance is achieved by a terminal connection and layering method. The electric field is canceled via a distributed turn-to-turn interleaving structure. With the integrated capacitor, the costs and space of a resonant capacitor can be saved. With the canceled electric field, the interference with neighboring components, such as touch-screen, can be reduced. Other benefits can include low-profile and fabrication convenience based on PCB technology. This coil can be useful for both consumer electronics and electric vehicle wireless charging.

In some examples, a series self-resonant coil structure for wireless power transfer comprises: a first conductive layer configured in a first planar spiral arrangement, the first conductive layer comprising a first terminal; a second conductive layer configured in a second planar spiral arrangement, the second conductive layer comprising a second terminal; and a dielectric layer positioned between the first conductive layer and the second conductive layer. The first conductive layer, the second conductive layer, and the dielectric layer are configured to produce a repeated serial LC connection between the first terminal and the second terminal. The first conductive layer comprises at least one discontinuity and the second conductive layer is continuous at the location of the at least one discontinuity mirrored about the dielectric layer.

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

BRIEF DESCRIPTION OF THE DRAWINGS

FIG. 3A shows a series self-resonant coil. FIG. 3B shows a compensated series self-resonant coil. FIG. 3C shows a symmetric compensated series self-resonant coil.

FIG. 4A shows the top layer shape, seen from the top. FIG. 4B shows the bottom layer shape, seen from the top.

FIG. 9A shows the distribution for a conventional coil and FIG. 9B shows the distribution for an example self-resonant coil.

FIG. 12A shows LC vs R (represented by Q), and FIG. 12B shows LC vs $A_{ind}$ (represented by $V_{ind}$) at 20 μT field.

FIG. 13A shows parameters for CSRC, FIG. 13B shows parameters for HRSC, and FIG. 13C shows parameters for FSRC.

FIG. 14A shows SC, FIG. 14B shows CSRC, FIG. 14C shows HSRC, and FIG. 14D shows FSRC.

FIG. 19 is a chart illustrating simulated E-field comparison with four-turn circular coil.

FIGS. 20A-20C show a simulated dielectric loss comparison. FIG. 20A shows the scale, FIG. 20B shows the simulation for CSRC, and FIG. 20C shows the simulation for FSRC.

FIG. 20D shows Table I, a comparison of the measured and calculated circuit parameters. FIG. 20E shows Table II, a comparison of measured and calculated circuit parameters.

FIG. 21A shows a fabricated FSRC coil. FIG. 21B shows a 100 W wireless charging station.

DETAILED DESCRIPTION

Figure 1:
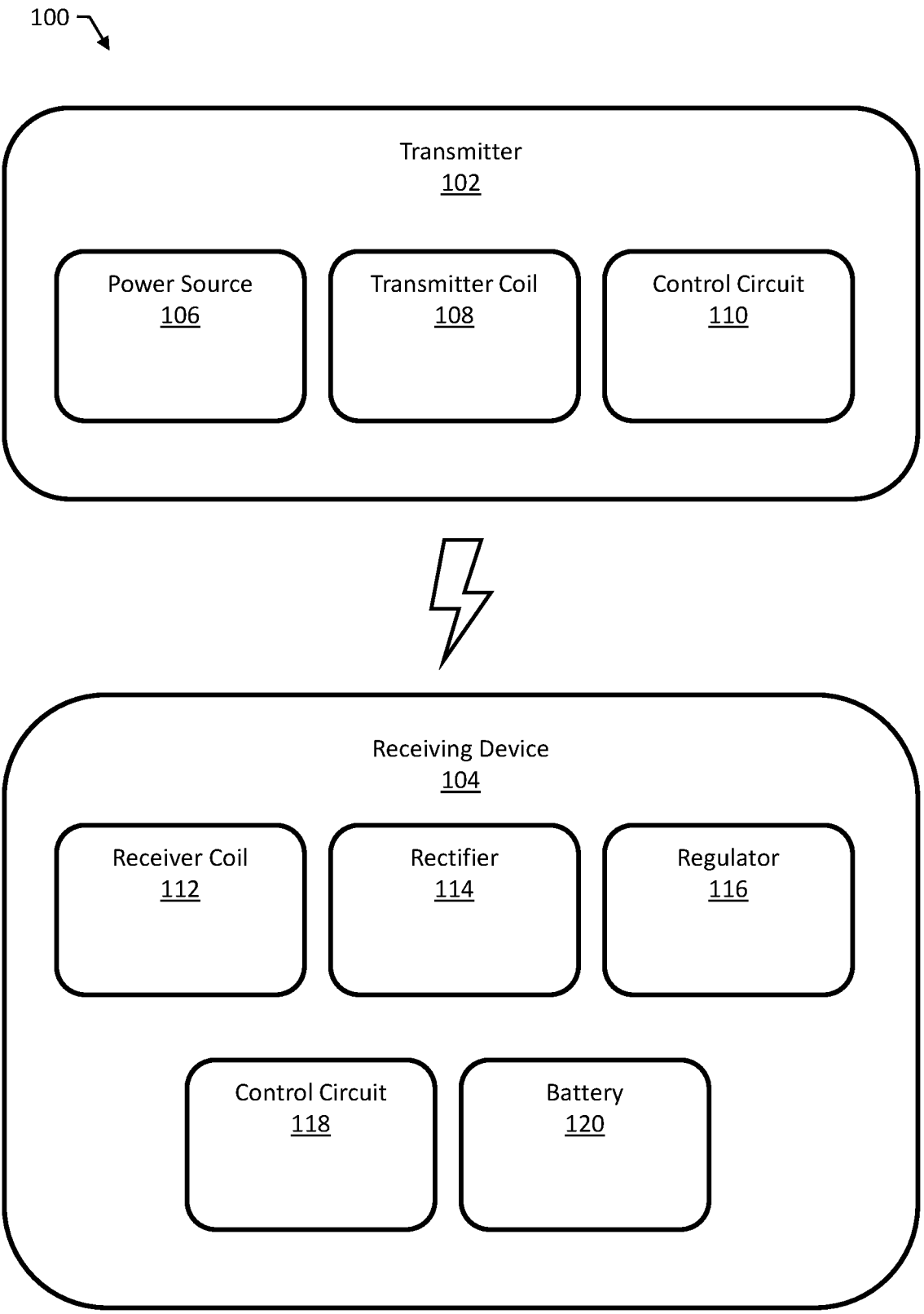
FIG. 1 is a block diagram of an example wireless power transfer system.

FIG. 1 is a block diagram of an example wireless power transfer system 100. The system 100 includes a transmitter 102 and a receiving device 104.

The transmitter 102 includes a power source 106, a transmitter coil 108, and a control circuit 110. The power source 106 is responsible for providing electrical power to the transmitter 102. It could be a battery or an AC power source, depending on the implementation. The power source 106 may also include a power management circuit that regulates the input voltage to the transmitter 102.

The transmitter coil 108 generates a magnetic field that is used to transfer power wirelessly to the receiving device 104. The transmitter coil 108 may be a single coil or an array of multiple coils, depending on the design of the system. The geometry and placement of the coil(s) may also vary depending on the application.

The control circuit 110 is configured for controlling and monitoring the wireless power transfer process. The control circuit 110 may include a microcontroller or other electronic components that generate and modulate the magnetic field generated by the transmitter coil 108. The control circuit 110 may also monitor the charging status and regulate the output voltage to ensure a stable and efficient power transfer. The control circuit 110 may be implemented using various electronic components such as diodes, capacitors, inductors, and transistors.

The receiving device 104 can be any appropriate kind of electrical device, e.g., a consumer electronics device such as a cell phone or a laptop, or an electric vehicle or a medical implant device. The receiving device 104 includes a receiver coil 112, a rectifier 114, a regulator 116, a control circuit 118, and a battery 120.

The receiver coil 112 receives the magnetic field generated by the transmitter coil 108 and converts it into electrical power. The receiver coil 112 may be a single coil or an array of multiple coils, depending on the design of the system. The geometry and placement of the coil(s) may also vary depending on the application.

The rectifier 114 converts the AC voltage produced by the receiver coil 112 into DC voltage that can be used to charge the battery 120 or power the device. The rectifier 114 may be implemented using diodes or other electronic components that allow current to flow in one direction.

The regulator 116 maintains a constant output voltage by adjusting the input voltage, which can be useful for powering electronic devices that require a stable power supply. The regulator 116 may be implemented using electronic components such as voltage regulators or DC-DC converters.

The control circuit 118 controls the wireless power transfer process, monitors the charging status, and regulates the output voltage. The control circuit 118 may include a microcontroller or other electronic components that communicate with the control circuit 110 in the transmitter 102 to ensure efficient and safe power transfer. The control circuit 118 may also include safety features such as overvoltage protection, overcurrent protection, and temperature sensing.

The battery 120 stores the electrical energy transferred from the transmitter and provides power to the device 104 when needed. The battery 120 may be a rechargeable battery, such as a lithium-ion battery, that can be charged wirelessly using the wireless power transfer system. The battery 120 may also include a battery management circuit that monitors the battery status and controls the charging process.

In wireless power transfer for consumer electronics applications like cell phones or laptops, onboard receiver coils must be designed to be low-profile and exhibit low stray field. The limited space available in compact mobile devices prevents the use of thick solid copper wire to reduce power loss. Both the WPT operation and nearby components are sensitive to leakage magnetic field and electric field. Magnetic leakage field causes eddy currents in neighboring metal or PCB traces, potentially destroying the magnetic coupling with the transmitter side.

To alleviate some or all of these issues, the transmitter coil 108 or the receiver coil 112 or both can include a series self-resonant coil structure. For example, the series self-resonant coil structure can be a fully compensated self-resonant coil (FSRC) with series LC resonance and reduced surface electric field for application in wireless power transfer for consumer electronics. By having a repeated series LC connection along the entire coil trace, the series resonant structure achieves high-Q, low E-field, and thin profile simultaneously.

Figure 2A:
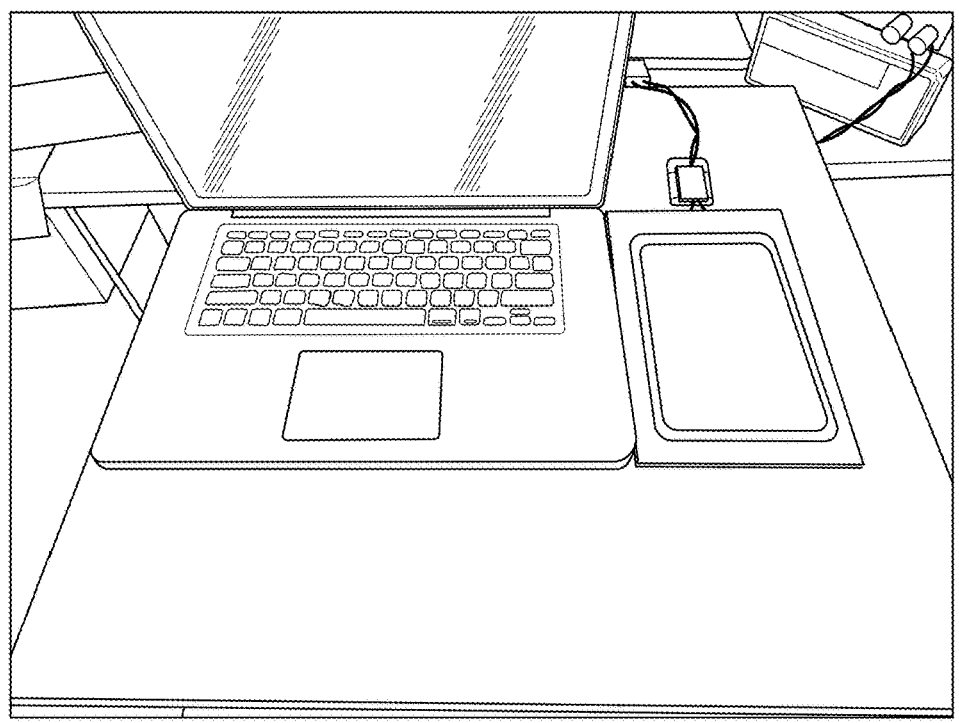
FIG. 2A shows a prototype wireless power transfer system to a laptop with a metal case.
Figure 2B:
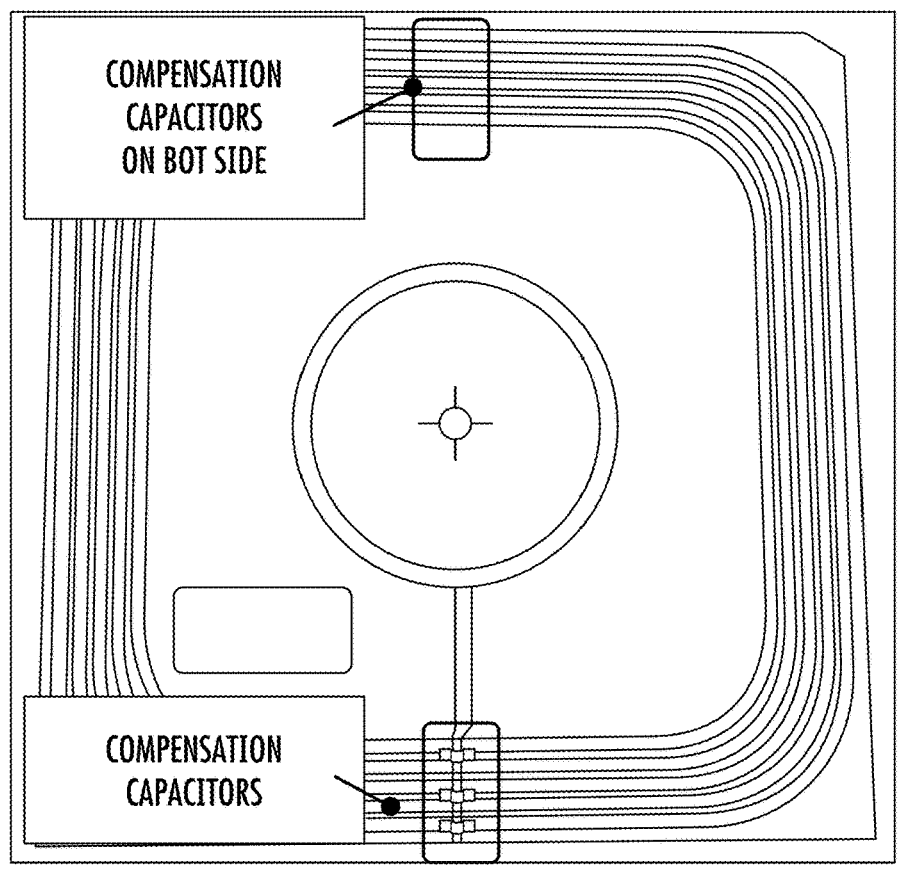
FIG. 2B is a picture of a commercial coil, showing the repeated distributed compensation.

FIG. 2A shows a prototype multi-receiver 6.78 MHz wireless charging station. When a 50 W receiver is placed under an aluminum-body laptop, the induced voltage after rectification reduces 30-fold compared to results without the laptop, preventing charging. To protect magnetic coupling and reducing interference with neighbouring objects, without requiring patterning of the metal case, ferrite shielding can be employed on an external coil. The addition of ferrite to the system changes the coil induced voltage and self-inductance and must be considered when designing the coil.

In addition to the leakage magnetic field, the electric field, generated due to the voltage drop along the length of the coil, can interact with nearby sensitive electronics, including capacitive touch screens. The leakage electric field also potentially causes dielectric loss in neighboring materials, such as the coil substrate, neighboring circuits, and ferrite shielding. To reduce leakage electric field, discrete distributed capacitors may be used to compensate the voltage potential of each turn. Current commercial Airfuel receivers use distributed lumped capacitors, which introduces additional parasitic ESR. The physical size of the capacitor (typically 0805 packages) significantly increases the coil height.

This document presents the receiver coil and receiver-side design for, e.g., laptop applications. The ferrite impact is modeled and included. An example self-resonant coil is proposed to achieve low profile, low E-field, and high Q validates the coil operation, modeling, and systematic design.

Example Coil Stricture and Working Principles

In order to address the need for a thin coil with compensated electric field and shielded magnetic field, a new symmetric fully-compensated self-resonant coil structure is described in this document.

Figure 3C:
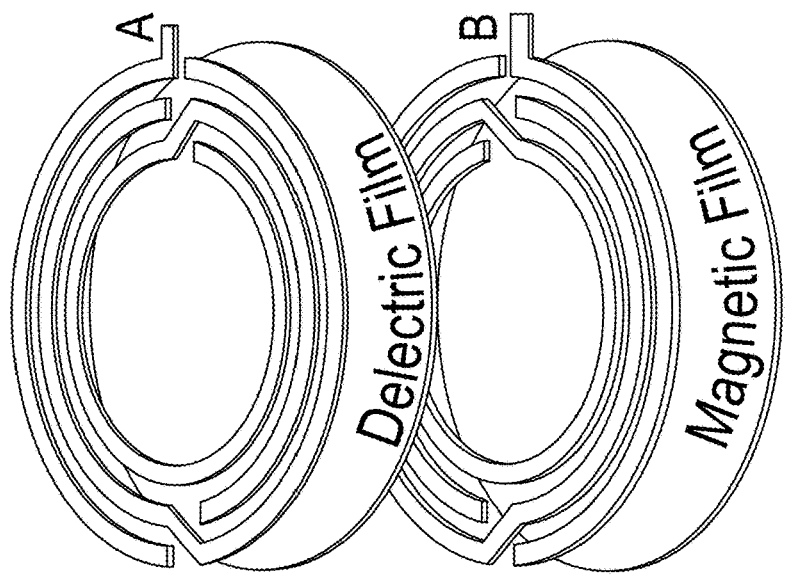
FIGS. 3A-3C show a comparison of self-resonant coil structures.
Figure 3B:
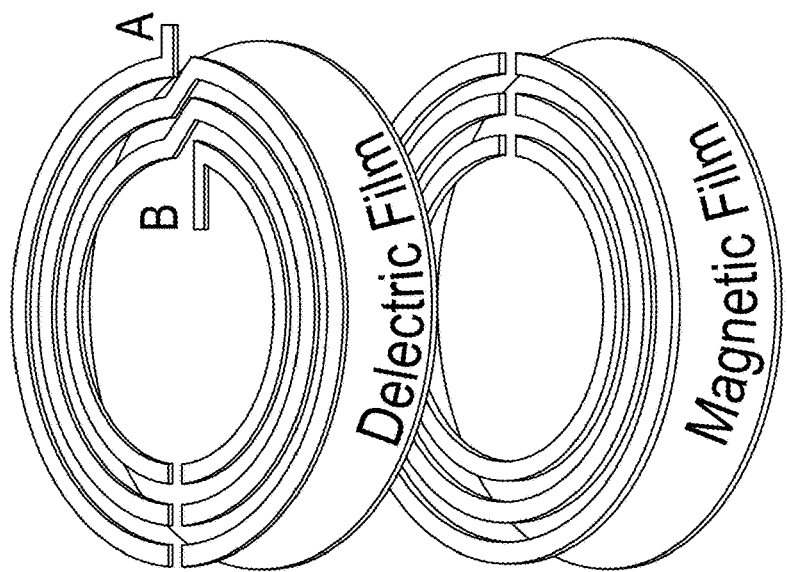
Figure 3A:
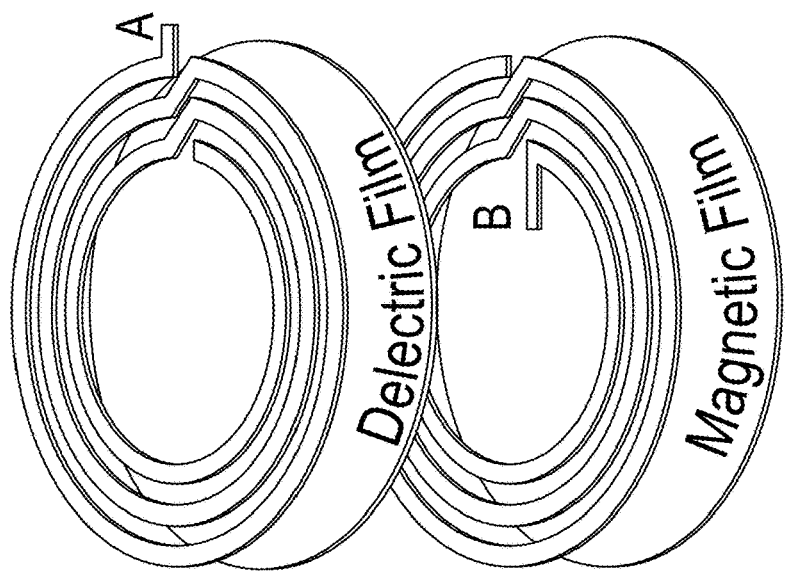

FIG. 3A gives an exploded view of a circular, 3-turn series self-resonant coil (CSRC) with magnetic shielding. The coil is formed by two copper spirals and a dielectric layer sandwiched between them. The terminals of the coil, A and B, are on opposite layers and opposite ends of the spirals. Any AC current path between terminals A and B traverses the 3-turn spiral once and crosses the dielectric layer once.

FIG. 3B shows a half-turn compensated version of the series self-resonant coil. Gaps are places in each copper spiral such that the current paths between the coil terminals now cross the dielectric film multiple repeatedly every halfturn of the coil. This repeated crossing of the dielectric creates a distributed electric field compensation. In this design, terminals are on the same layer, but opposite ends of the spiral. In height constrained applications, this terminal arrangement presents a challenge as an additional conductor layer is required to bring terminal B back to the outside of the coil to connect to the power stage.

FIG. 3C shows a symmetric version of the compensated coil. By aligning the gaps with the turn-to-turn connections, this implementation allows both terminals of the device to be on the outside of the coil.

Figure 3D:
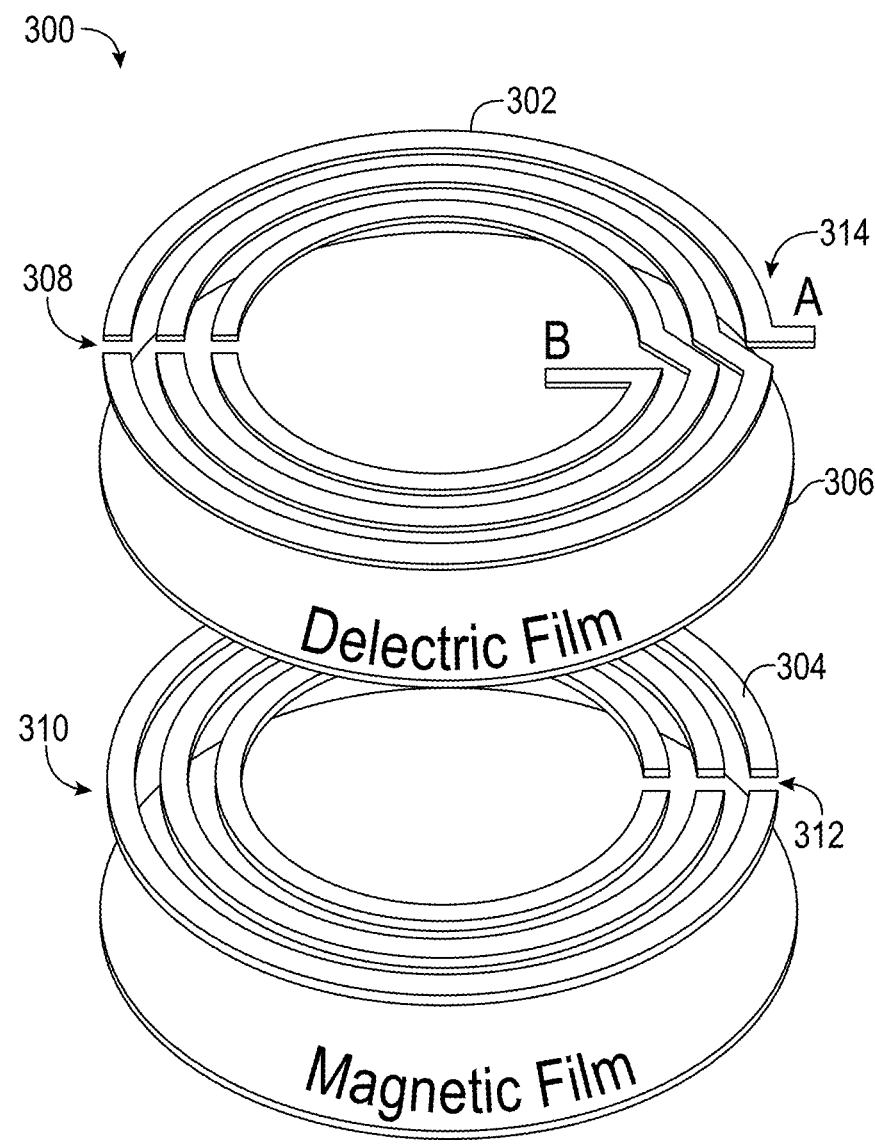
FIG. 3D shows the coil structure of the half-turn compensated version of the series self-resonant coil and a current flow diagram.

FIG. 3D shows the coil structure 300 of the half-turn compensated version of the series self-resonant coil and a current flow diagram 320 illustrating the flow of current in the coil structure 300. The coil structure 300 includes a first conductive layer 302 configured in a first planar spiral arrangement having a first terminal "A." The coil structure 300 includes a second conductive layer 304 configured in a second planar spiral arrangement having a second terminal "B." The coil structure 300 includes a dielectric layer 306 positioned between the first conductive layer 302 and the second conductive layer 304.

The conductive layers 302 and 304 can have a number of discontinuities, i.e., breaks in the spiral arrangement, where the opposite conductive layer is continuous in locations corresponding to the discontinuities, i.e., in locations mirrored about the dielectric layer 306. For example, the first conductive layer 304 has a first number of discontinuities 308 on the left side of the diagram, and the second conductive layer 304 is continuous in the corresponding location 310 mirrored about the dielectric layer 306. In another example, the second conductive layer 304 has a second number of discontinuities 312 on the right side of the diagram, and the first conductive layer 302 is continuous in the corresponding location 314 mirrored about the dielectric layer 306.

Figure 3E:
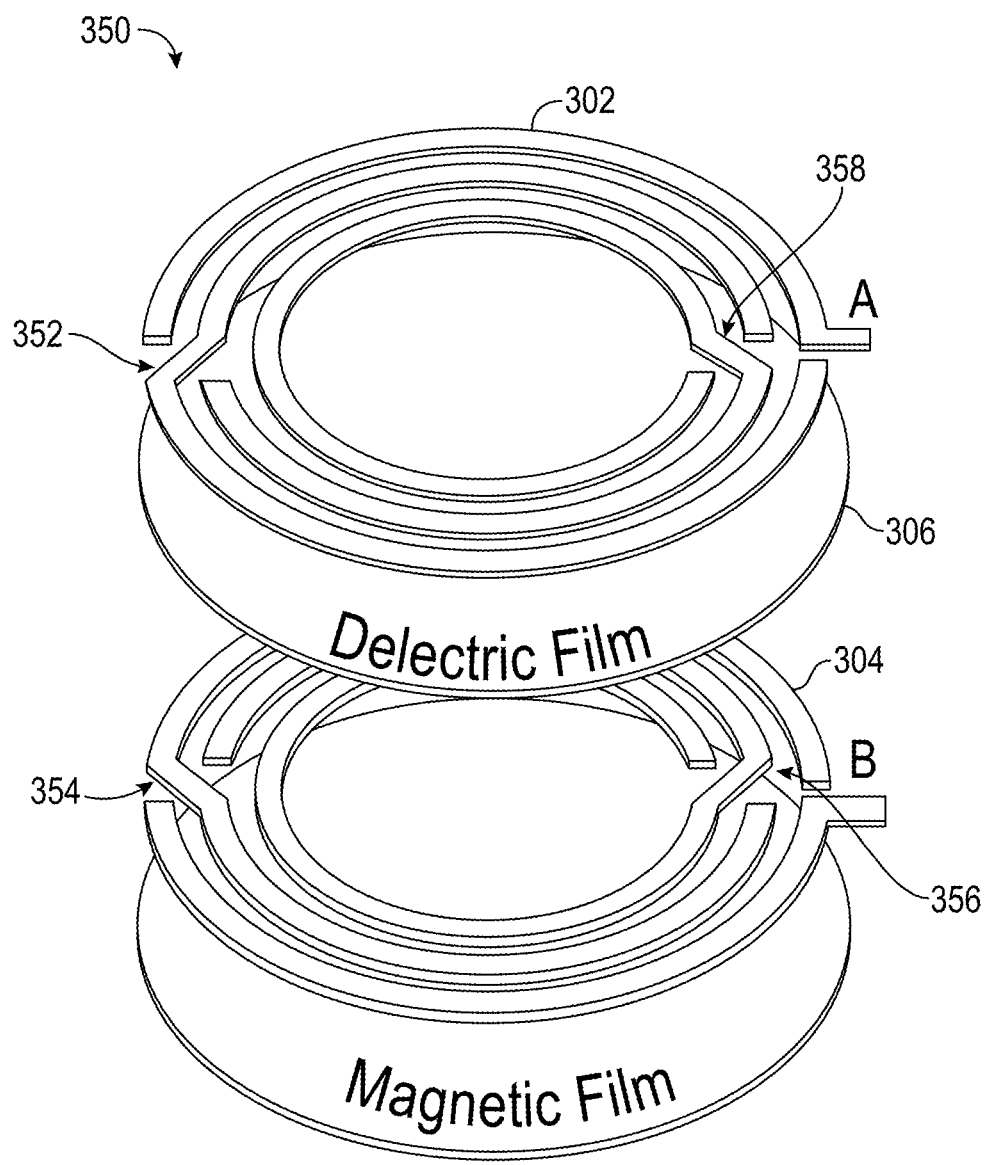
FIG. 3E shows the coil structure of the symmetric version of the series self-resonant coil and a current flow diagram.
Figure 3E:
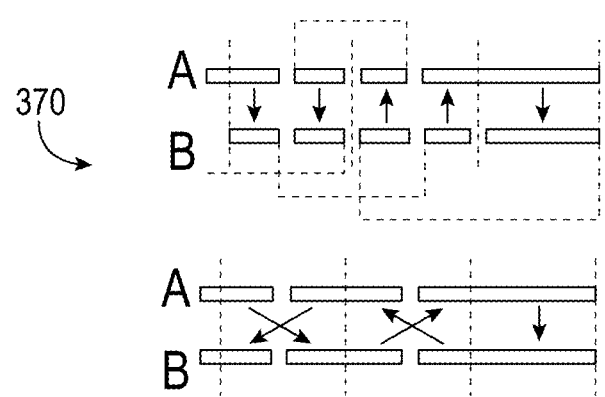

FIG. 3E shows the coil structure 350 of the symmetric version of the series self-resonant coil and a current flow diagram 370 illustrating the flow of current in the coil structure 350. The discontinuities of the conductive layers 302 and 304 of the coil structure 350 result in an interleaved symmetric structure with repeated serial LC connections.

For example, the first conductive layer 304 has discontinuity where the spiral arrangement comprises a diagonal bridge 352 between two turns of the planar structure, and the second conductive layer 304 has a discontinuity where the spiral arrangement comprises a diagonal bridge 354 in an opposite connection of two turns of the planar structure at a location mirrored about the dielectric layer 306. The coil structure 350, in this example, also includes opposing diagonal bridges 356 and 358 on a different side of the coil structure 350.

Figure 4A:
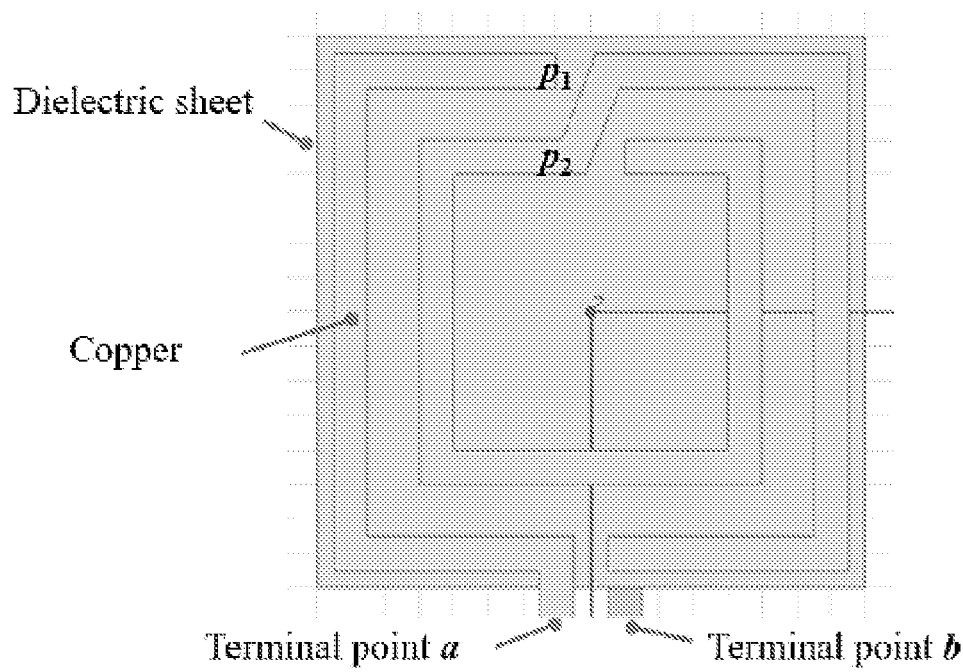
FIGS. 4A-4B show the structure of a square, 2-turn FSRC.
Figure 4B:
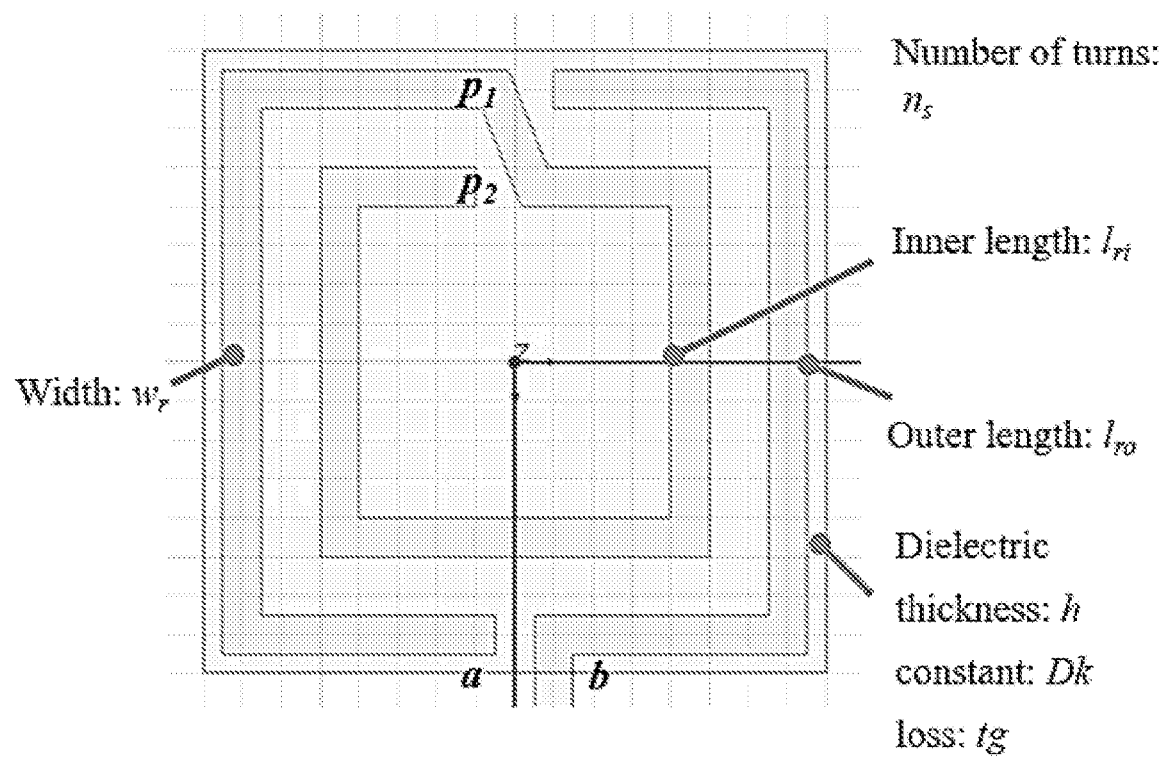

FIG. 4 shows greater detail of a 2-turn, square, symmetric fully-compensated self-resonant coil structure (FSRC). The structure is created using a double-sided copper-clad dielectric laminate. The shape of the two copper coils is carefully designed to provide resonant inductance. The surface area of the copper and the dielectric material is carefully designed to form the resonant capacitors between the two copper layers. Terminals a and b on the outer extent of the coil and on opposite layers are connected to the AC source (e.g., WPT inverter).

Due to the complete separation of the two conducting layers by the dielectric, the coil is an open circuit for a dc source. When an ac source is applied, current flows from one terminal to the other crossing through the dielectric multiple times, resulting in a repeated series LC connection, and the total capacitance consists of three distributed parasitic capacitances in series. The three parasitic capacitor sections are: 1) point a to $p_1$, 2) point $p_1$ to $p_2$, and 3) point $p_2$ to b.

Similar to a parallel-plate capacitor, the current transitions between two layers in the form of displacement current $J_d = \varepsilon_r \varepsilon_0 \partial E/\partial t$ where $\varepsilon_r$ is the relative permittivity of the dielectric material. As in the uncompensated conventional series self-resonant coil, the electric field between the two copper layers is constant within each capacitor section, which leads to the uniform distribution of $J_d$ along the length and width of the trace in each section.

Due to the uniform $J_d$ in each capacitor section, the input current linearly transitions from the input terminal a on the top to the end of the first half turn, to the bottom layer at point $p_1$. At point a and $p_1$, the entire coil current flows through one of the conductors, with zero in the opposite conductor. In the next section, the current linearly transitions from the $p_1$ on the bottom conductor to the end of the inner turn to the top layer at point $p_2$. Then, the current linearly transitions from the $p_2$ on the top conductor to the end of the outer turn to the bottom layer at point b. At point $p_2$ and b, the entire coil current flows through one of the conductors, with zero in the opposite conductor.

Figure 5:
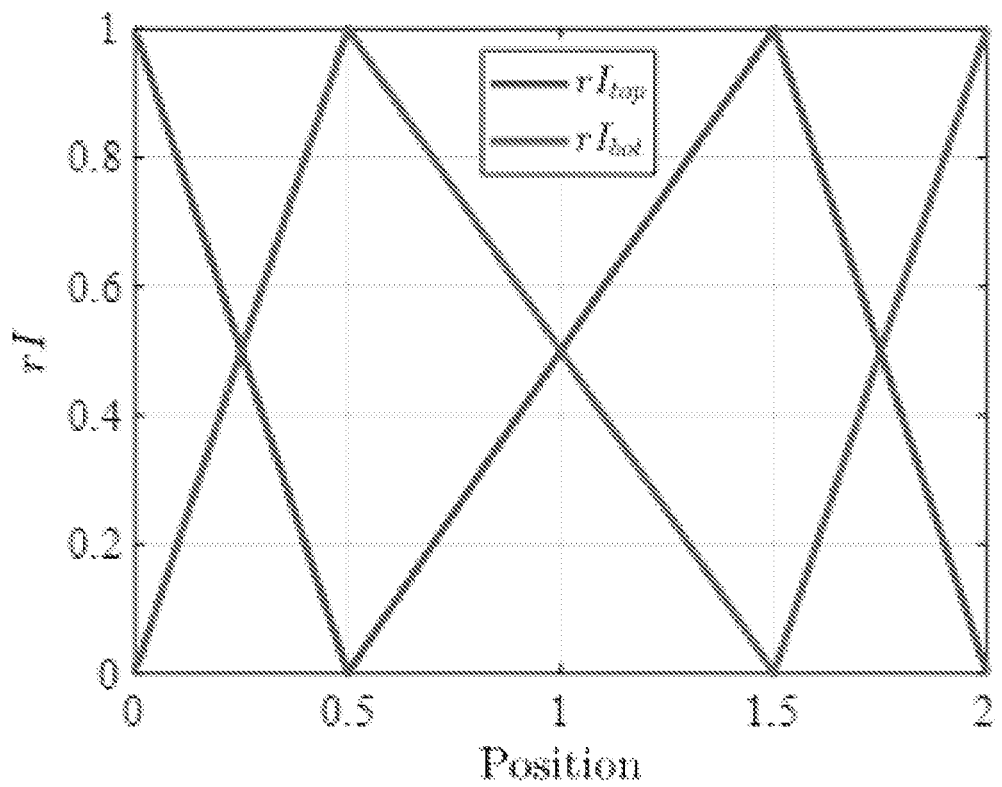
FIG. 5 is a diagram showing the current distribution along the longitude change of coil length. rl is the fraction of the terminal coil current and the position axis is relative to the number of turns in the coil.

The current distribution on the two conductor layers is summarized in FIG. 5 showing current crossing the dielectric between top and bottom layers multiple times, resulting in series LC characteristic with distributed capacitance and reducing nearby fringing E-field.

Figure 6B:
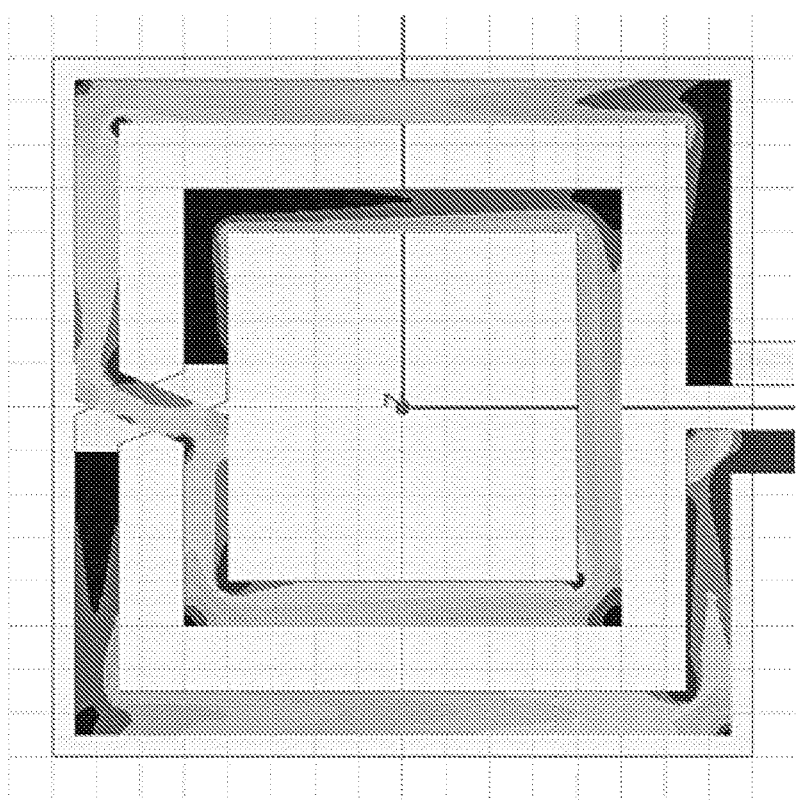
FIG. 6B shows the bottom view.
Figure 6A:
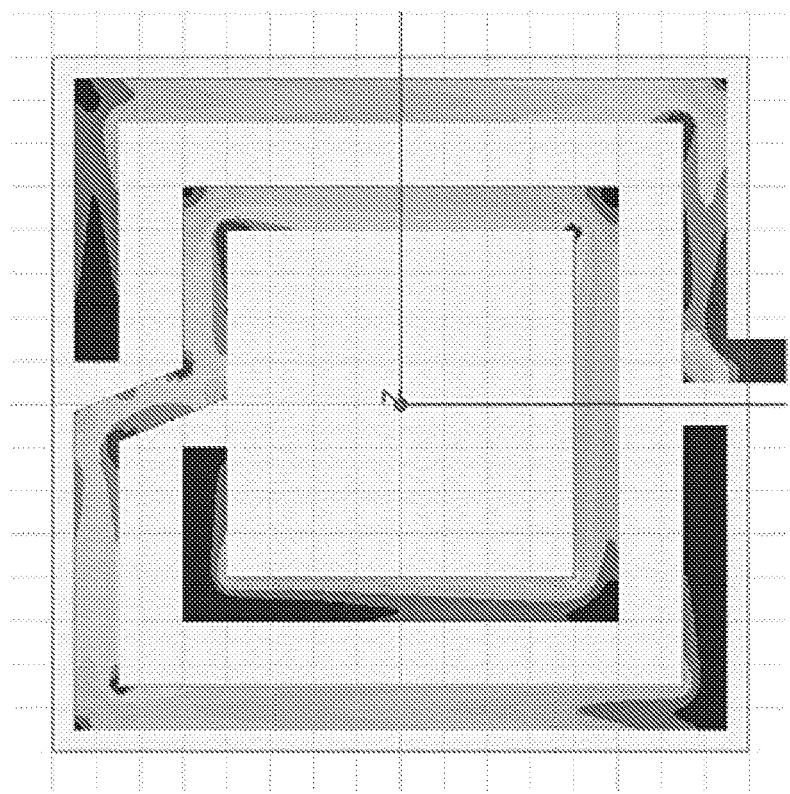
FIG. 6A shows a simulated current density distribution from a top view.
Figure 6A:
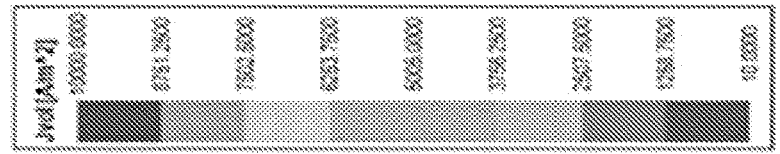

Full-wave FEA simulation is used to verify the current distribution pattern. The results are shown in FIGS. 6A-6B, which agree with the analyzed current distribution.

Figure 7B:
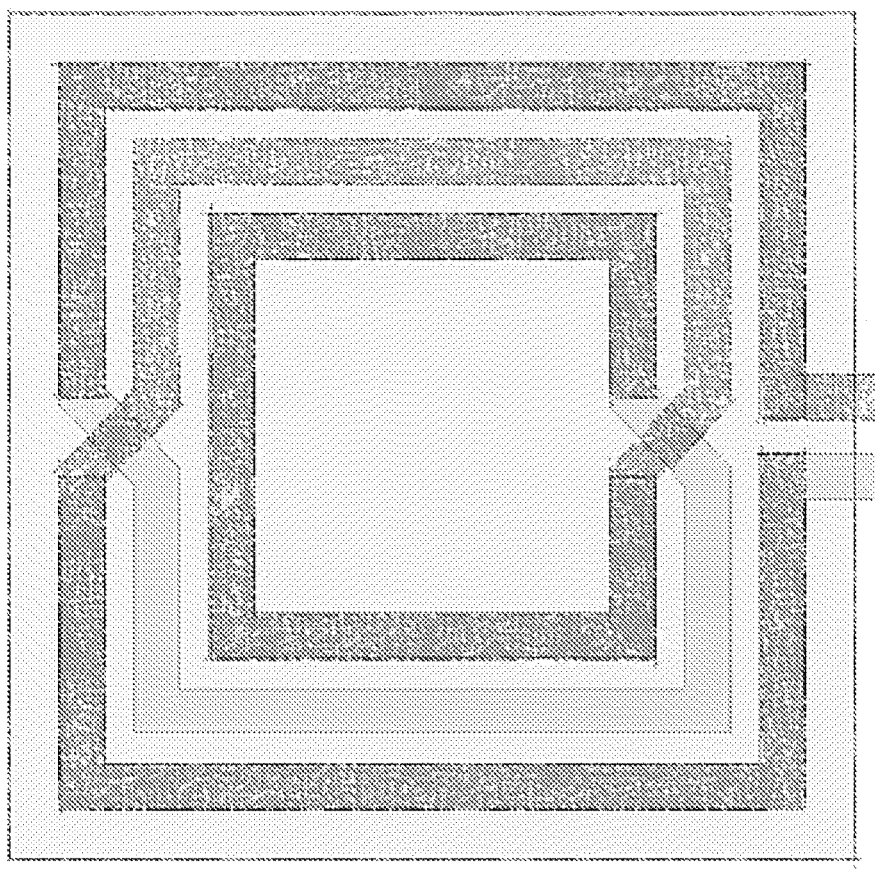
FIG. 7A shows a top view of an HRSC structure and FIG. 7B shows a top view with transparent dielectric. The dashed grey trace represents the bottom layer seen through from the top.
Figure 7A:
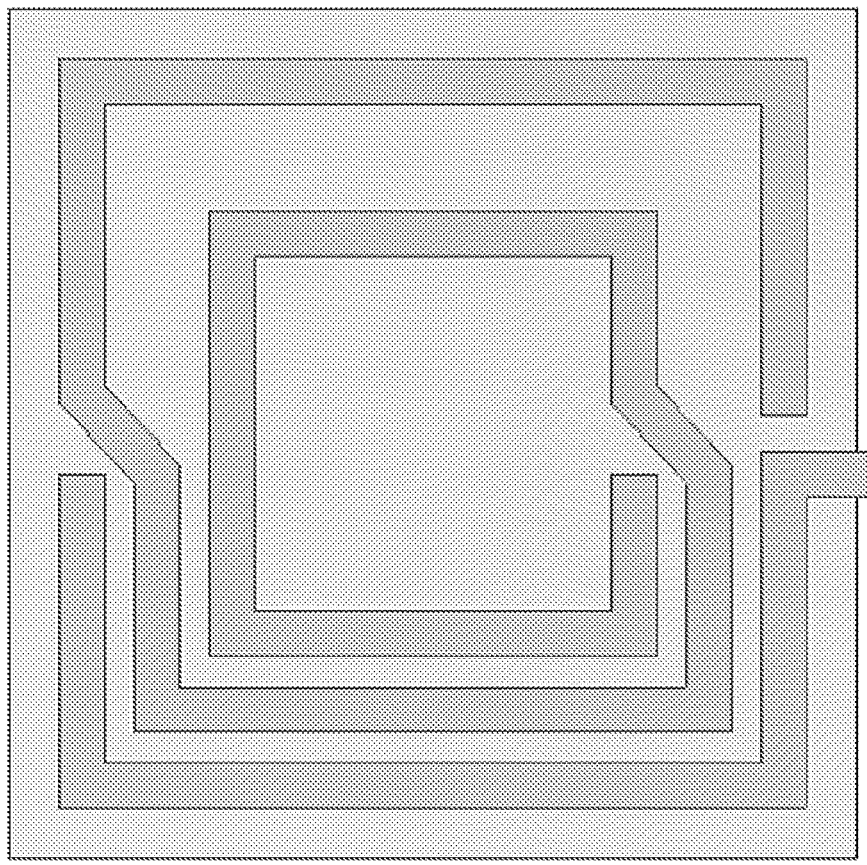

In FIG. 4 each half turn is compensated by a parasitic capacitor forming a fully compensated self-resonant coil. This structure potentially can be combined with conventional planar coil to for a new structure that compensates every other turn, forming a hybrid self-resonant coil (HSRC). FIGS. 7A-7B show a three-turn example where the voltage potential of the outermost and innermost turn is compensated by parasitic capacitors, but the middle turn is not compensated.

The symmetric FSRC has an additional series capacitance for each half-turn of the coil. Thus the total equivalent capacitance is small and it may be difficult to acquire the target capacitance and coil resonant frequency given geometric constraint. Compared to other self-resonant coils without repeated series capacitances, the FSRC may require thin, high permittivity dielectric materials to achieve the same resonant frequency. Compared to the FSRC, the HSRC has a reduced number of series capacitances, thus the maximum achievable capacitance is larger than FSRC with the same dielectric and geometry. Due to the reduced compensation, the leakage electric field for HSRC is larger than FSRC but is smaller than conventional coils.

Coil Modeling and Design Procedures

Figure 8:
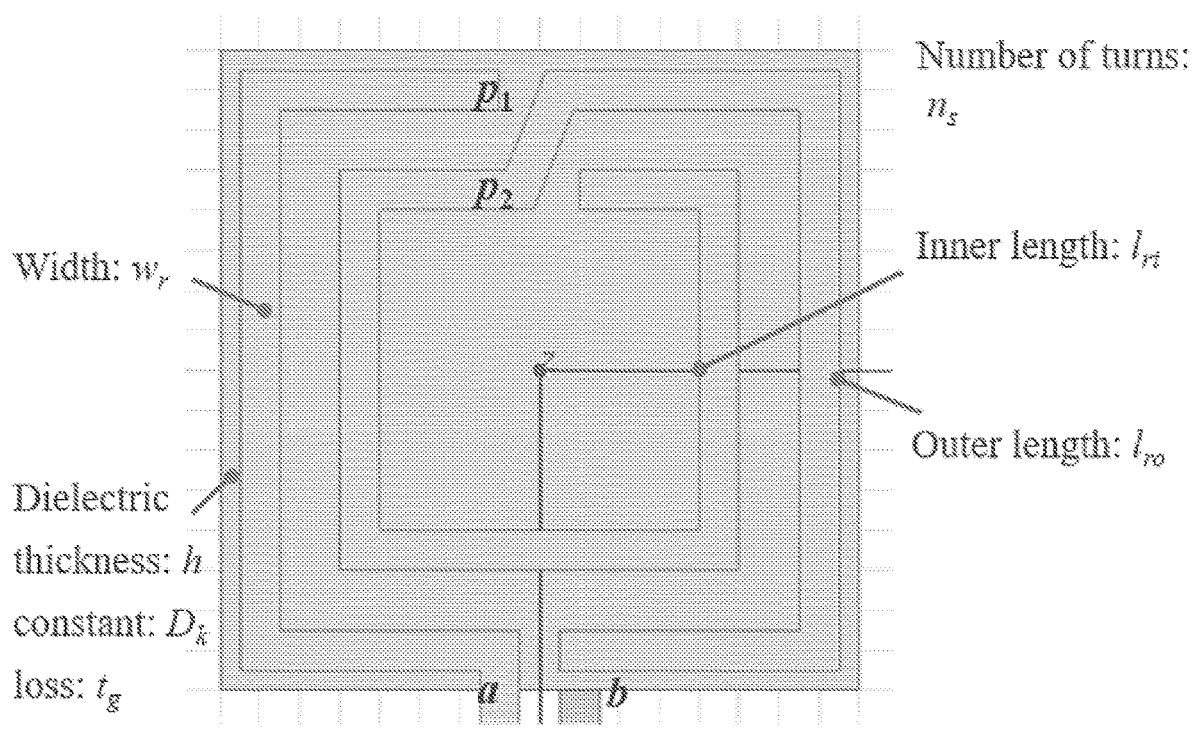
FIG. 8 shows the geometry of an example coil.

The geometric parameters of the coil are shown in FIG. 8. $w_r$ is the width of each turn, $l_i$ is the inner length, and $l_o$ is the outer length. $n_s$ is the number of turns of one layer, and $h_r$ is the thickness of the dielectric layer. t is the copper thickness. The dielectric constant and loss tangent are $D_k$ and $t_g$, respectively.

To examine the performance capabilities, analytical models for the inductance, capacitance and resistance are developed based on results from the literature and FEA-assisted simulations. L is analyzed based on magnetic field simulation. C and R are analyzed based on comparison to existing self-resonant coils.

1. Inductance

Figure 9A:
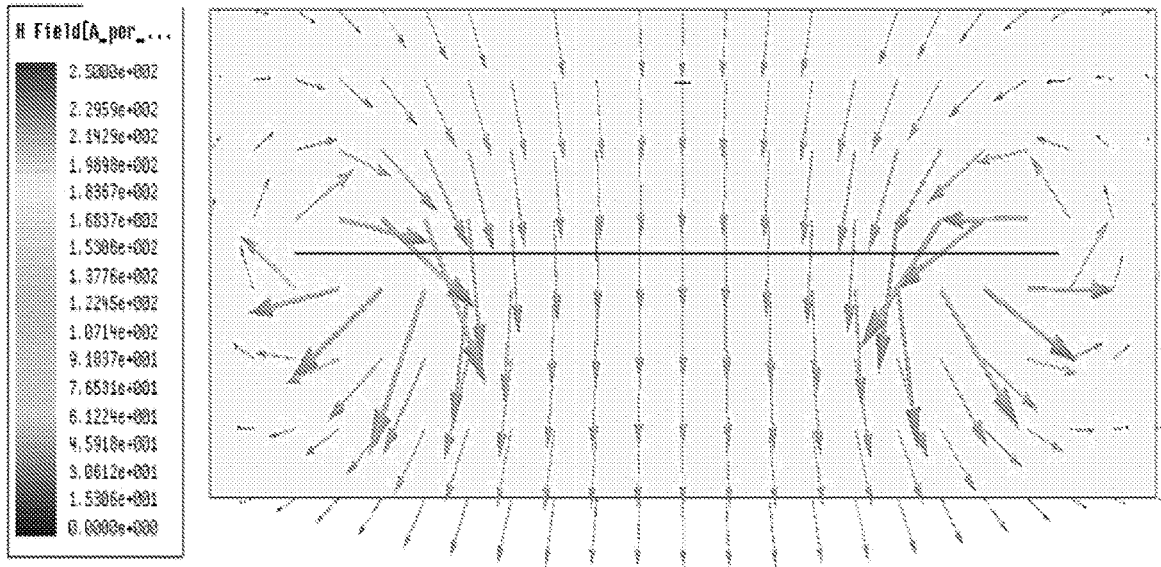
FIGS. 9A-9B show flux distributions when conducting 1 A, 6.78 MHz current.
Figure 9B:
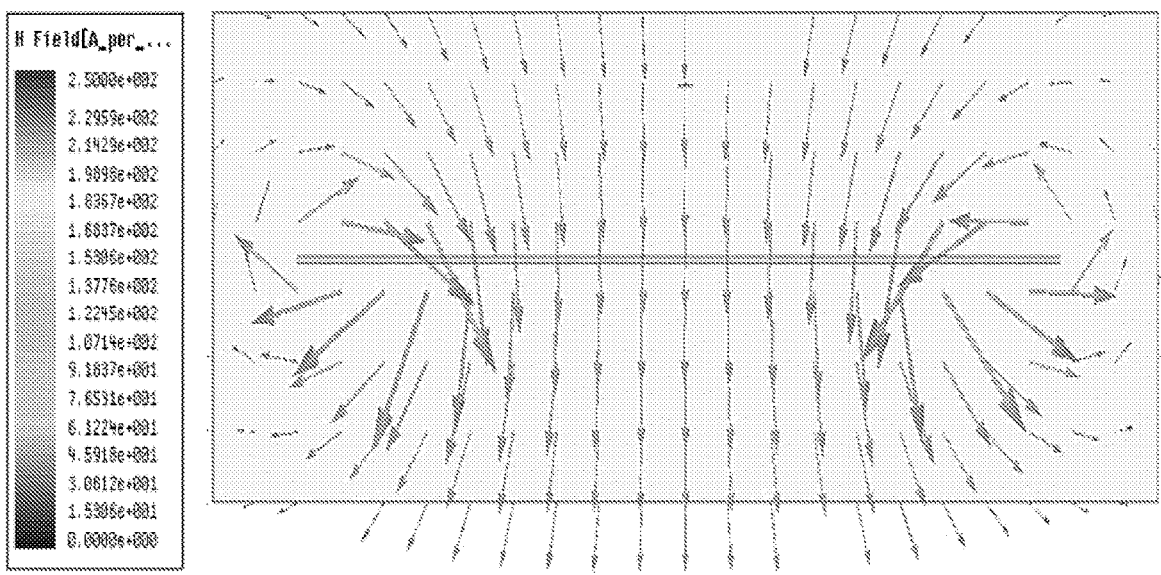

The top and bottom layers of the proposed coil have identical current flow directions (i.e. from input terminal towards output terminal). Compared to a conventional PCB coil, the current flow in the proposed coil differs only in that it crosses vertically through the dielectric layer. When the dielectric thickness is thin relative to the width, the magnetic flux distribution of the proposed self-resonant coil and the traditional PCB coil are nearly identical. FIGS. 9A-9B illustrate a magnetic field simulation comparing the flux distribution between a conventional single-layer coil (a) and a self-resonant coil (b), assuming both coils conduct 1 A 6.78 MHz current. Due to the identical flux distribution, the two coils have the same inductance.

The inductance of a conventional planar coil has been modeled empirically with an error of less than 3%, $$L_s = \frac{1.27\mu n^2(l_{ri}+l_{ro})}{4}\left(\ln\frac{2.07(l_{ri}+l_{ro})}{l_{ro}-l_{ri}} + 0.18\frac{l_{ro}-l_{ri}}{l_{ro}+l_{ri}} + 0.13\left(\frac{l_{ro}-l_{ri}}{l_{ro}+l_{ri}}\right)^2\right) \quad (1)$$

where $l_{ro}$ and $l_{ri}$ are the outer and inner turn radii, respectively.

2. Capacitance

Compared to a conventional self-resonant coil, FSRC has the same parallel-plate structure in each capacitor section of each half-turn. Thus, the capacitance of each section is modeled using the same method as a CSRC The $i^{th}$ turn capacitance of a CSRC is $$C_i = \frac{D_k\varepsilon_0 w_r 4l_{ri}}{h_r}\left[1 + \frac{h_r}{\pi w_r}\ln\frac{2\pi h_r}{w_r} + \frac{h_r}{\pi w_r}\ln\left(1+\frac{h_r}{2w_r}+2\sqrt{\frac{t}{h_r}+\left(\frac{t}{h_r}\right)^2}\right)\right] \quad (2)$$

For FSRC, the total capacitance is the series connection of each half turn and the innermost turn $$C_{fsrc} = \frac{1}{\sum_{i=2}^{n_r}\frac{4}{C_i}+\frac{1}{C_1}} \quad (3)$$

For HSRC, the total capacitance is the serial connection of each half-turn that has a self-resonant structure, excluding the non-self-resonant turns. For HSRC, if the self-resonant turn is the odd number of turns, the capacitance is $$C_{hsrc} = \begin{cases} \dfrac{1}{\sum_{i=2}^{n_r/2}\dfrac{4}{C_{(2\leftarrow i-1)}}+\dfrac{1}{C_1}}, & n_r = 2k \\ \pm\dfrac{1}{\sum_{i=2}^{(n_r+1)/2}\dfrac{4}{C_{(2\leftarrow i-3)}}+\dfrac{1}{C_1}}, & n_r = 2k+1 \end{cases} \quad (4)$$

where k is integer starting from 3.

3. Coil EST

The total loss of the self-resonant coil include copper loss and dielectric loss. The copper loss can be modeled as skin-effect loss plus proximity effect loss. The skin effect loss is calculated through the integration of the loss density over the whole coil. The proximity loss is through the calculation of the proximity field on each turn, and calculation of the proximity loss afterward.

The input current linearly transitions from the top to bottom spiral over the whole length in each capacitor section, which is the same as in CSRC. Thus, skin-effect ESR of the $i^{th}$ turn is, if configured as a self-resonant structure $$R_{skin,i} = \frac{2\rho_{copper}4l_{ri}}{3w_r\delta\left(1-e^{-\frac{t}{\delta}}\right)} \quad (5)$$

If the ith turn is configured as a conventional structure as in a HSRC, the skin-effect ESR is $$R_{skin,i} = \frac{\rho_{copper}4l_{ri}}{w_r\delta\left(1-e^{-\frac{t}{\delta}}\right)} \quad (6)$$

The total skin-effect ESR is $$R_{skin} = \sum_{i=1}^{n_r}R_{skin,i}.$$

In addition to the skin effect, the time-varying H-field around the coil traces causes eddy current loss in the copper foil. Since the H-field in the FSRC coil has an almost identical H-field compared to a conventional coil (as shown in FIG. 9), the magnetic field distribution and the proximity related ESR are calculated using the same method as in a CSRC.

$H_c$ is the H-field strength at the center point. $H_{in}$ is the H-field strength at the innermost point. $H_{out}$ is the outermost field. The H-field strength drop on each turn $dH = H_{in} - H_{out})/n$. As has been shown previously:

$$H_c = \frac{nI_{in}}{(l_{ro} - l_{ri})} \ln \frac{\sqrt{l_{ro}^2 + t^2} + l_{ro}}{\sqrt{l_{ri}^2 + h^2} + l_{ri}} \quad (7)$$

$$H_{in} = H_c \exp^{\frac{l_{ri}}{l_{ro}}\left(0.4 + 0.15 \ln \frac{l_{ro}}{4t+2h}\right)} \quad (8)$$

$$H_{out} = -H_c \left(0.4 + 0.08 \ln \frac{l_{ro}}{4t+2h}\right) \exp^{\frac{l_{ri}}{l_{ro}}\left(1 + 0.125 \ln \frac{l_{ro}}{4t+2h}\right)} \quad (9)$$

After obtaining the field distribution information, the proximity effect loss of $i^{th}$ turn is calculated using the standard formula for eddy-currents in a lamination $$P_{prox,i} = \frac{B_{avg,i}^2 w_s^2 t^2}{24 \rho_{copper}} Vol_i \quad (10)$$

where $V ol_i$ is the copper volume of the $i^{th}$ turn, $$V ol_i = 4(l_{i,in}^2 - l_{i,out}^2)t \quad (11)$$

where $l_{i,in}$ and $l_{i,out}$ are the inner and outer radius of $i^{th}$ turn, respectively. And $B_{avg,i}^2$ is the average peak flux density square of the proximal H-field $$B_{avg,i}^2 = \int_0^{w_r} \frac{\mu(Hl(i) + dH/w_r dl))^2}{w_r} = \mu^2 \left(Hl(i)^2 + \frac{(Hl(i) - Hr(i))^2}{3} + (Hl(i) - Hr(i))Hl(i)\right) \quad (12)$$

The proximity effect ESR of ith turn is $$P_{prox,i} = \frac{2 \sum_{i=1}^{n} P_{prox,i}}{I_{in}^2/2} \quad (13)$$

The total proximity-effect related ESR is $$R_{prox} = \sum_{i=1}^{n_r} R_{prox,i}$$

The dielectric loss is calculated based on the loss tangent $t_g$ of the dielectric material $$R_c = \frac{t_g}{2\pi f C_s} \quad (14)$$

Finally, the total equivalent series resistance (ESR) of the coil is $$R_s = R_{skin} + R_{prox} + R_c \quad (15)$$

Magnetic Shielding Effect

Figure 10:
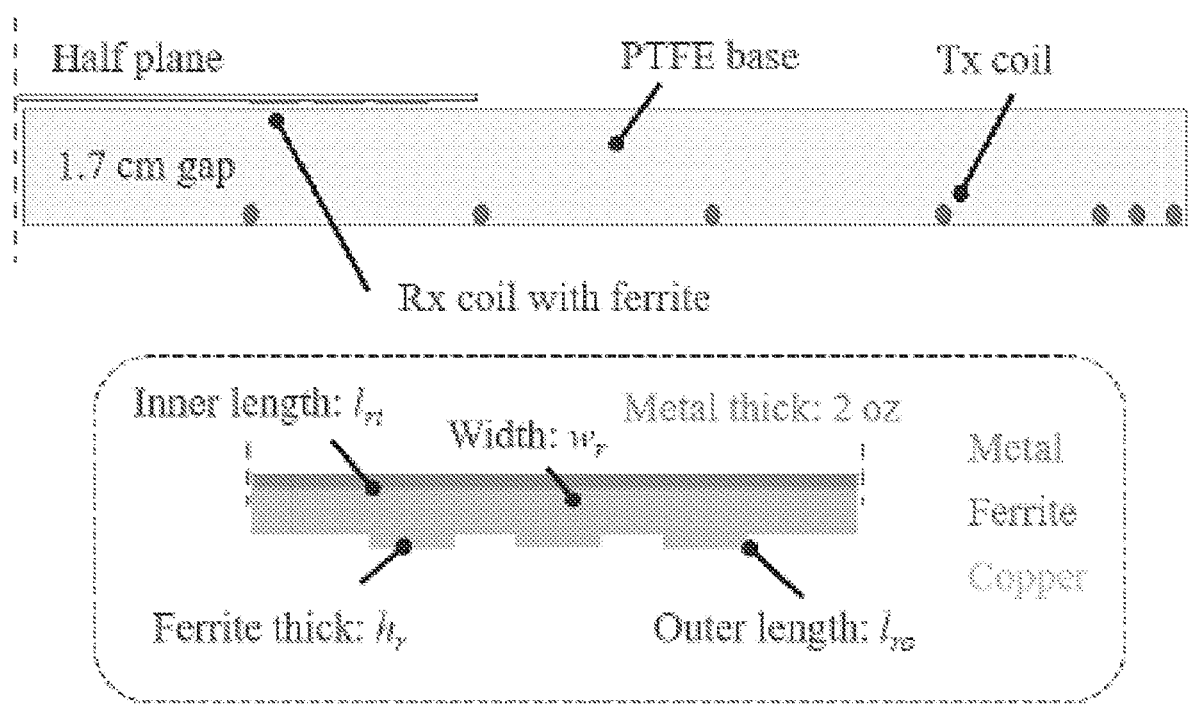
FIG. 10 is a schematic showing Maxell ferrite simulation.

The neighboring metal may destroy magnetic coupling and requires ferrite shielding, which impacts the receiver coil inductance and induced voltage. To facilitate the proposed self-resonant coil design, FEA simulation using Ansys Maxwell 2D is used to quantify the impact. The simulated geometry is shown in FIG. 10, which includes the transmitter coil with a uniform magnetic field.

Due to the uniform magnetic field, the coupling is constant if the receiver coil is placed on other positions on the transmitter surface, or if the transmitter coil is configured with other geometries as long as the field is uniform. The ferrite is a high frequency, low-loss material with a permeability of 120. The metal is a 2 oz copper layer representing a 2-layer PCB. The length of the coil is 17.8 cm (7 inch) and the maximum height is 1.02 mm (0.04 inch).

In the simulation, the geometry of the coil and the thickness of ferrite are swept to evaluate the shielding effect of various ferrite thicknesses. The inner radius is swept from 3 cm to 6 cm. The number of turns is swept from 2 to 3. The width is designed for each geometry leaving a 2 mm gap between adjacent turns. The outer length is fixed at 8.9 cm (3.5 inch) based on the space available on the laptop. The inductance and induced voltage are evaluated and compared for two situations: 1) with ferrite only, and 2) with ferrite+ copper. The results are shown in FIGS. 11A-11B.

Figure 11A:
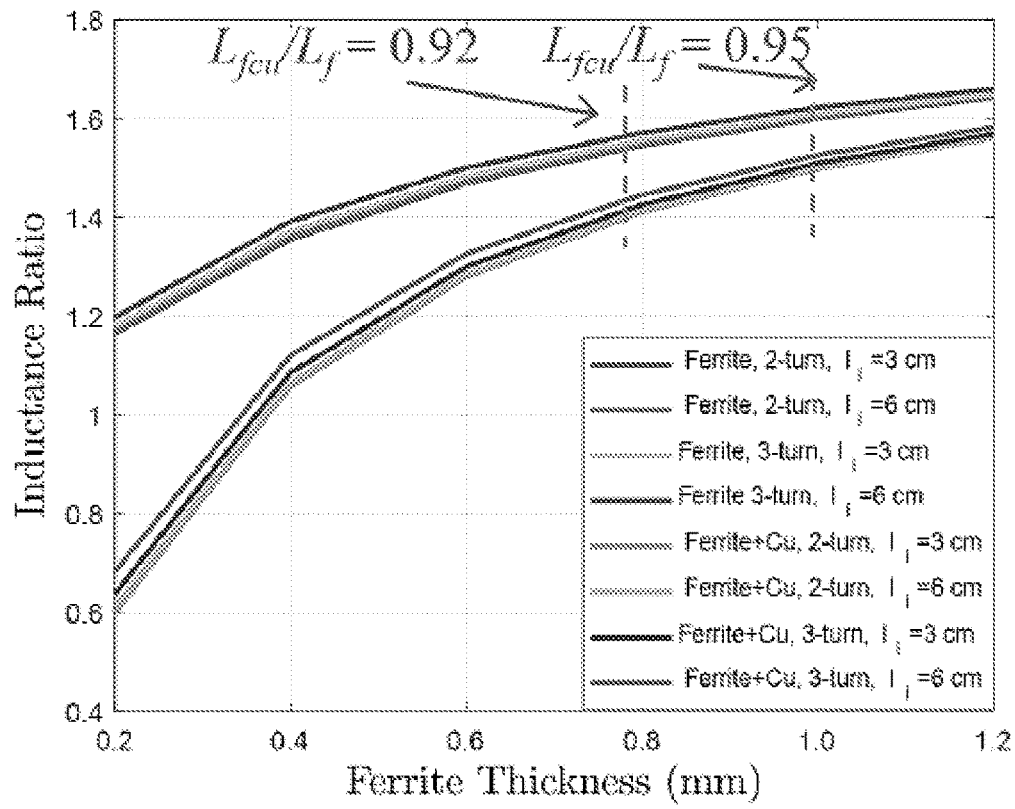
FIG. 11A shows simulated ferrite impact on inductance and FIG. 11B shows the impact on induced voltage.
Figure 11B:
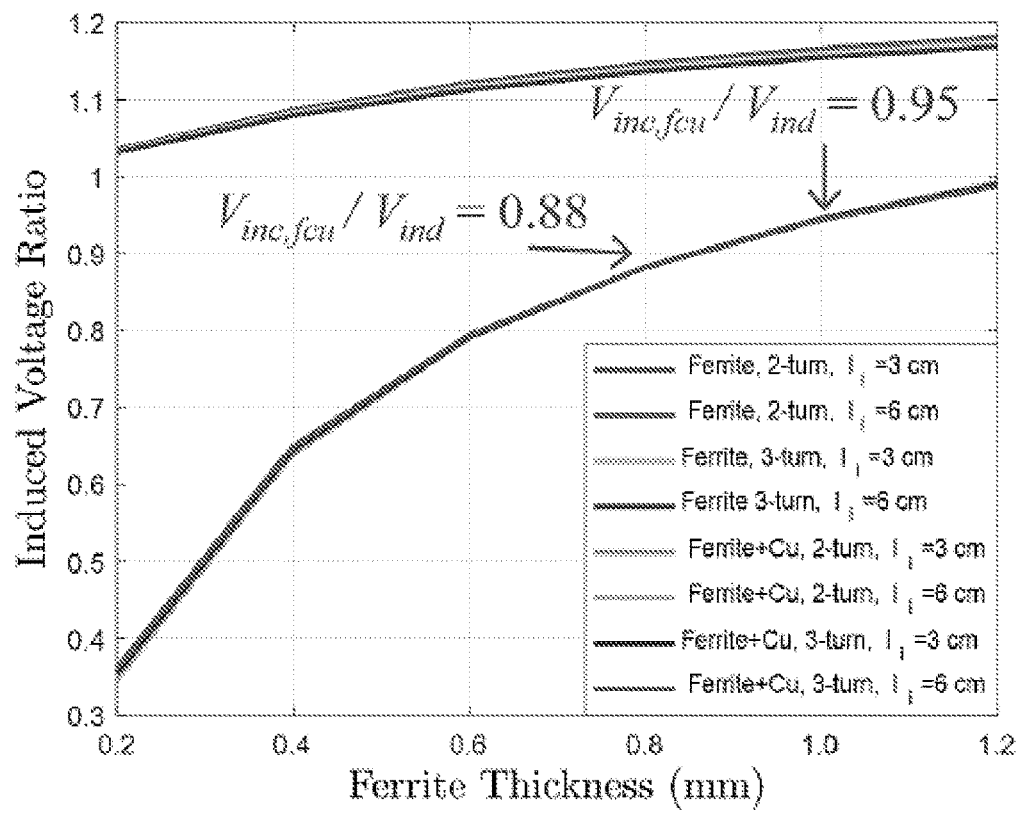

In FIG. 11A the inductance ratio is the inductance with ferrite only $L_f$ over the inductance of the coil without any shielding $L_0$, or the inductance with ferrite and copper $L_{fcu}$ over $L_0$. In FIG. 11B, the voltage ratio is the induced voltage with ferrite only $V_{ind,f}$ over the inductance of the coil without any shielding $V_{ind}$, or the inductance with ferrite and copper $V_{ind,fcu}$ over $V_{ind}$. Without the copper layer, the ferrite shielding enhances the magnetic field, thus increasing the coil inductance for all ferrite thicknesses. The ferrite also forms a low impedance loop that facilitates more magnetic flux penetrating the Rx coil, leading to an increased induced voltage. With the copper layer, part of the magnetic flux that penetrates through the ferrite causes eddy currents leading to a reduced inductance and induced voltage if the ferrite is thin. Increasing the ferrite thickness reduces the penetrating flux to the copper and thus increases inductance and induced voltage. A 1 mm ferrite is sufficient to reduce $L_{fc}/L_f$ to 5% and yields a voltage ratio of 0.95, and the improvement becomes increasingly slow after this thickness. Considering this, a ferrite thickness of 1 mm is selected, which is also approaching the height limit of 1.02 mm. Both voltage and inductance ratios will be used in the systematic design.

Coil Design

The FSRC and HSRC coils developed in the prior sections are compared to conventional coil geometries in a target 6.78 MHz, 50 W receiver. For each of the self-resonant coils, Rogers RO3003 dielectric is used. The substrate is 0.13 mm thick and has $D_k=3$ and $t_g=0.001$. Wurth 364003 RF ferrite sheet is used for the magnetic shielding layer.

Figure 12A:
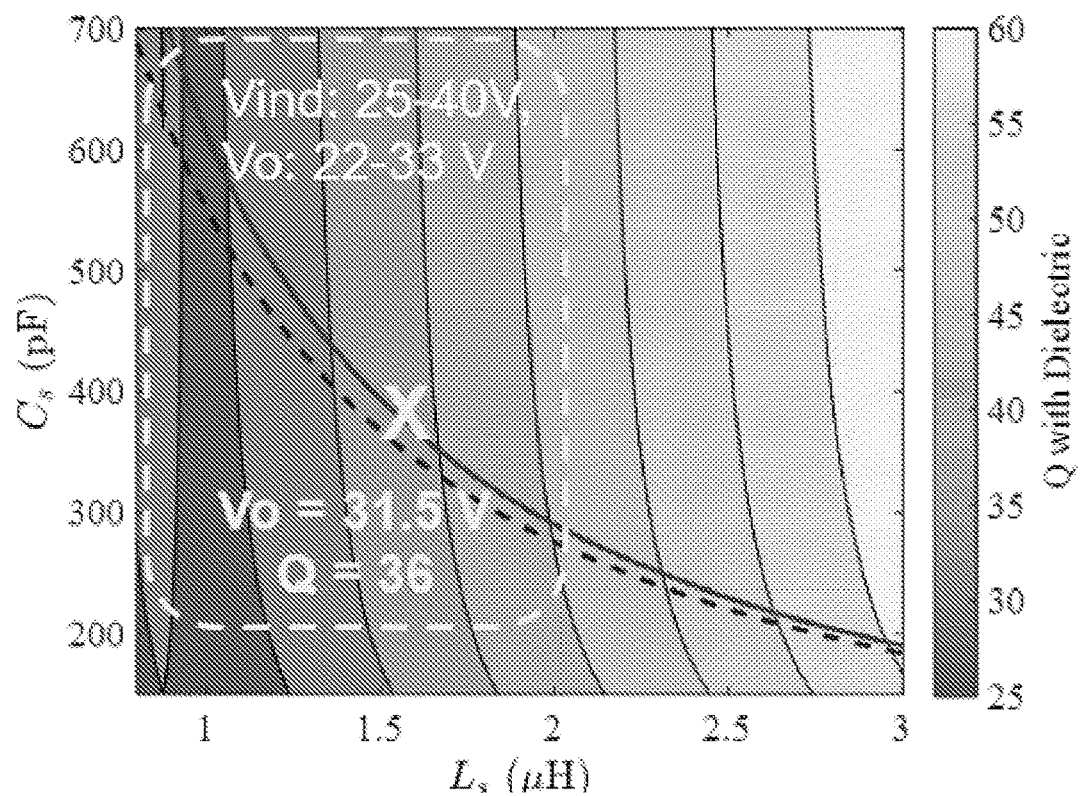
FIGS. 12A-12B show calculated coil circuit parameters for solid wire coil.
Figure 12B:
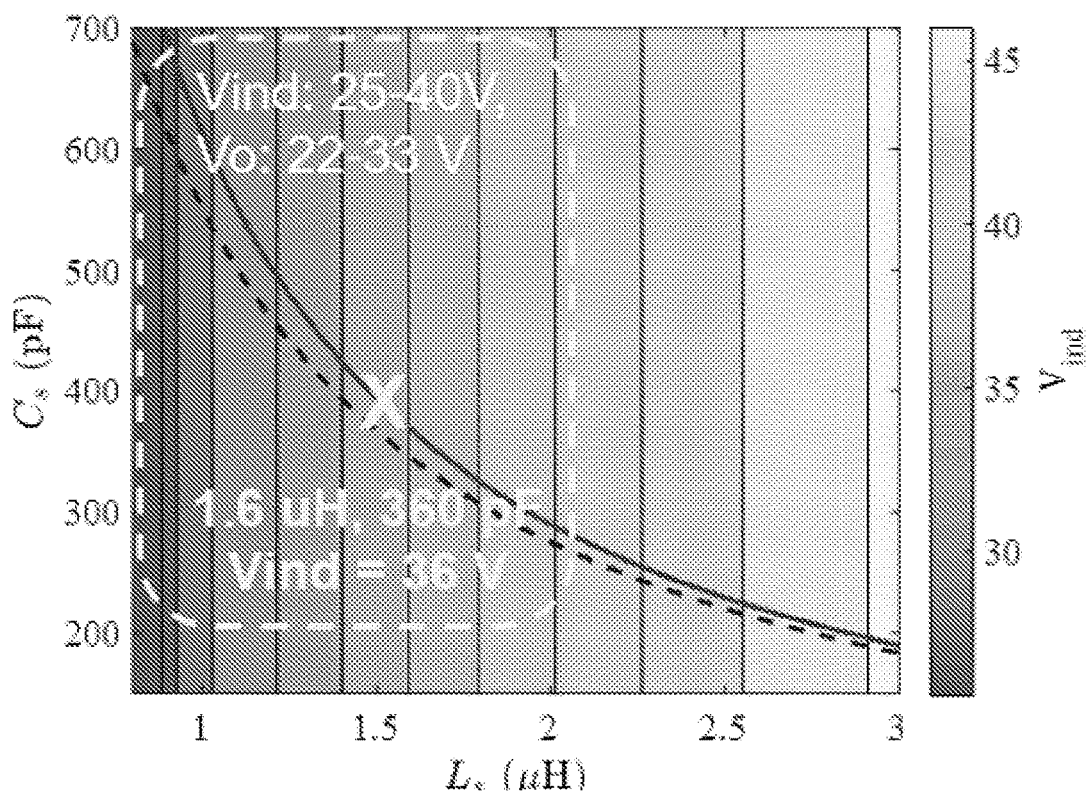

In the internal stage design, geometric iteration is used to calculate coil circuit parameters under application geometric requirements. Four types of coils are compared 1) solid copper wire coil, 2) conventional self-resonant coil (CSRC), 3) HSRC, and 4) FSRC. The modeling of 2) was previously reported. Sweeping geometries within application requirement, the designed circuit parameters for the solid coil are shown in FIGS. 12A-12B. Note that the thickness is constrained to 0.2 mm.

FIG. 12A shows the LCR parameters, where R is represented by Q for a better sense of the coil quality. The dashed curve indicates a 6.78 MHz LC resonance. One curve is the LC design that cancels reactance for a 50 W rectifier using B340LB diodes. The interested induced voltage area, which is also determined by the rectifier stage, is highlighted by the box. FIG. 12B is the induced voltage when the coil is placed in 20 µT magnetic field.

Figure 13A:
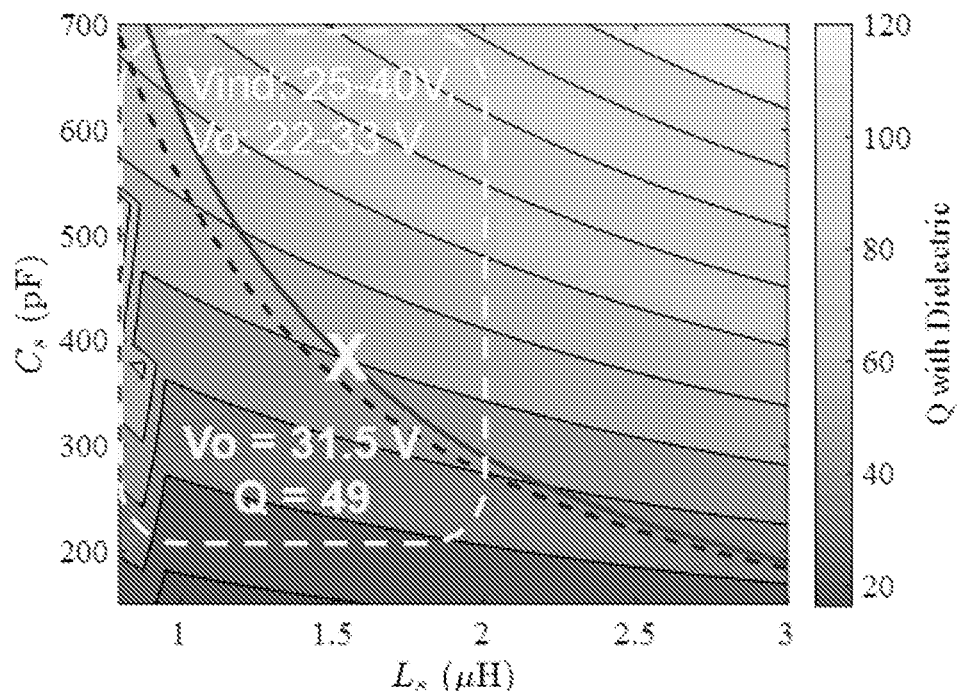
FIGS. 13A-13C show calculated coil circuit parameters.
Figure 13B:
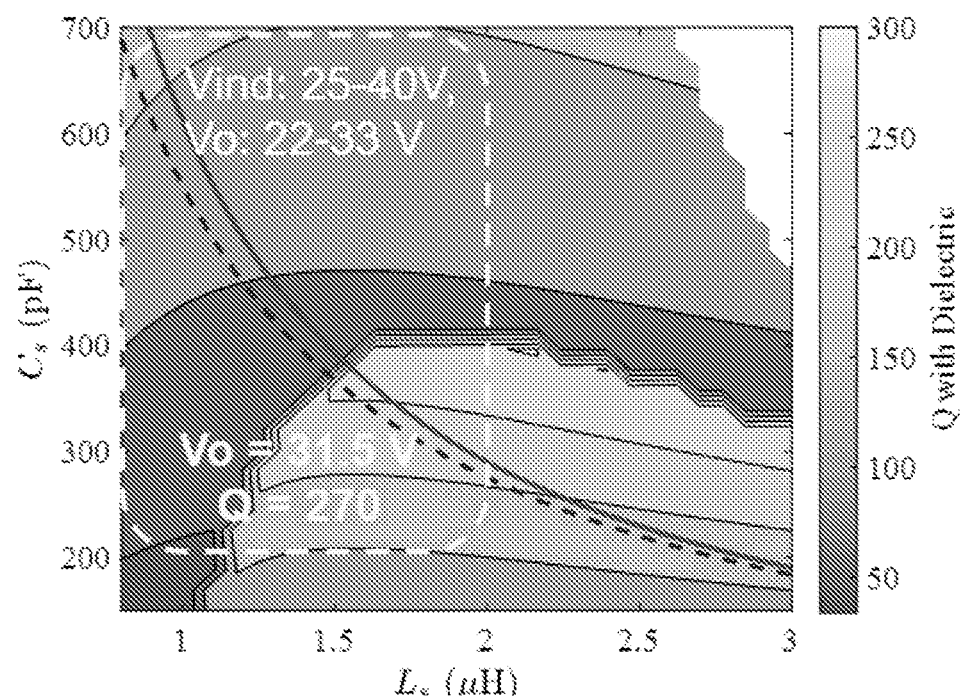
Figure 13C:
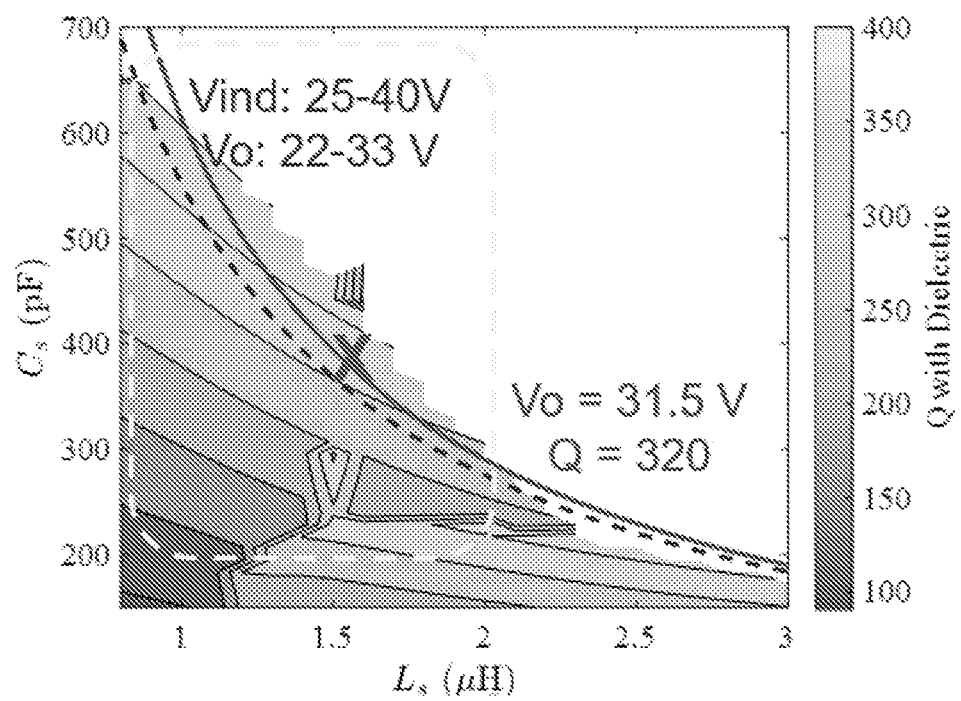
Figure 14A:
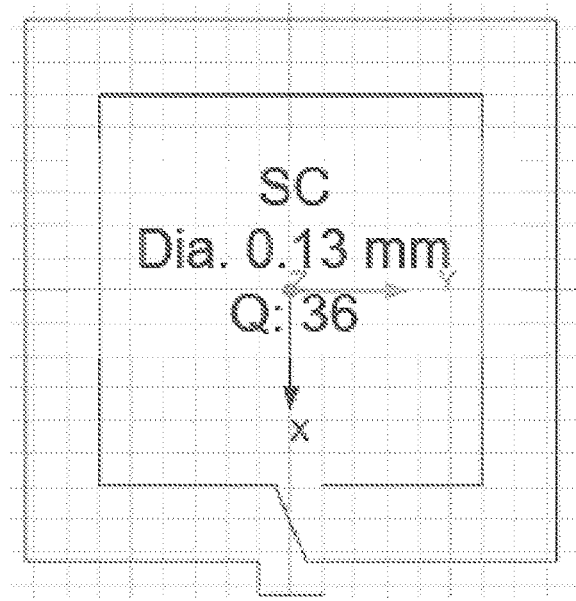
FIGS. 14A-14D show 4 coil structures corresponding to x marker.
Figure 14B:
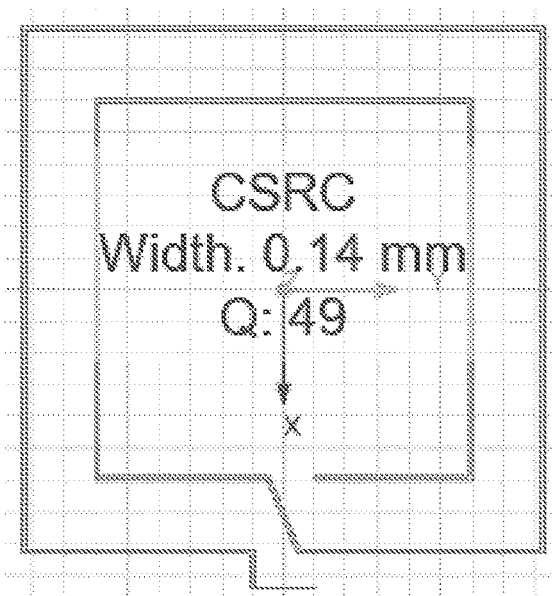
Figure 14C:
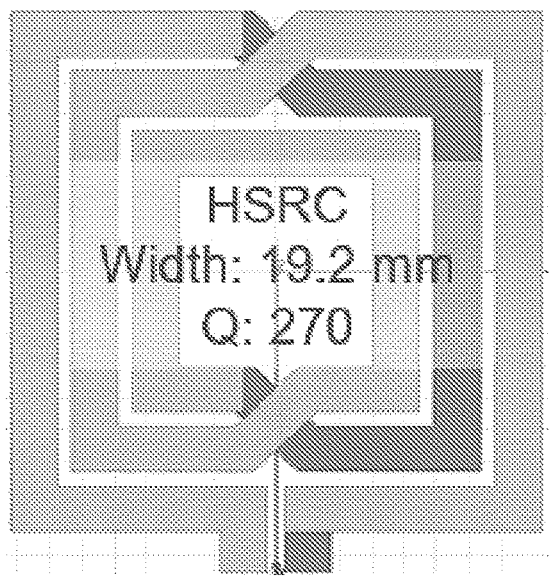
Figure 14D:
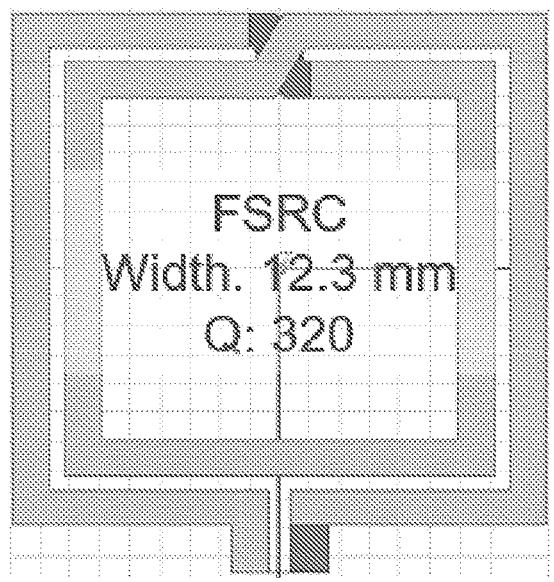

The design result for CSRC, HSRC, and FSRC are shown in FIGS. 13A-13B, all resulting from geometric iteration. The x symbols in FIGS. 13A-13B and FIGS. 12A-12B are designs with 1.60 µH, 360 pF, and 36 V induced voltage, which meet the requirements of the target application. A set of coil schematic corresponding to the x symbols are shown in FIGS. 14A-14D.

With limited thickness, solid copper can only use thin wire and have limited conduction area, thus limiting the Q. CSRC configures the capacitors of every turn in parallel, requiring a limited capacitance from each turn, thus resulting in the thin width design. In comparison, HSRC and FSRC configure the capacitance of each turn (if any) in series, expanding the required capacitance of each turn, thus resulting in a wider traces than CSRC.

Figure 15A:
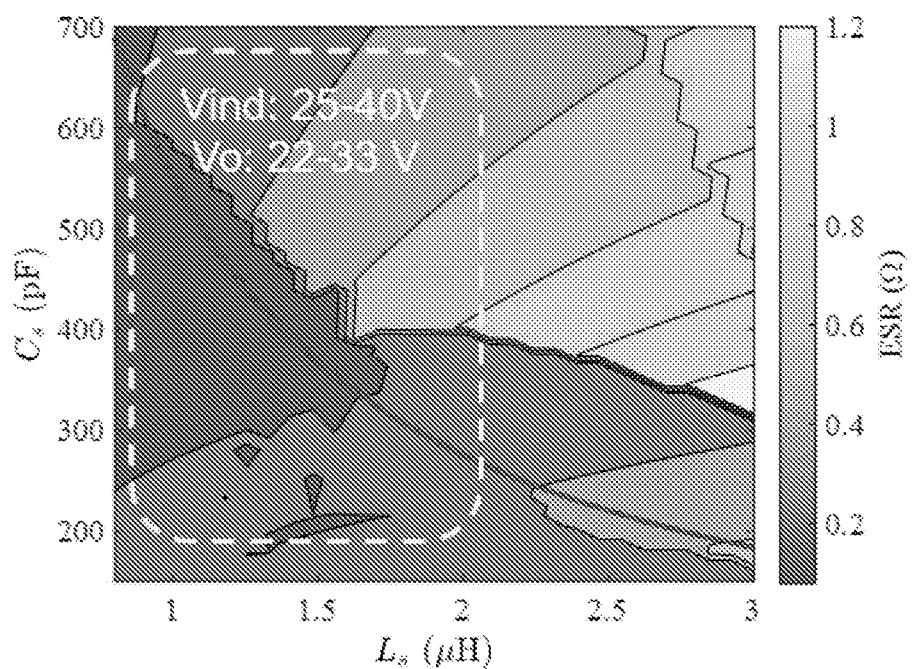
FIG. 15A shows minimum ESR for each LC combination.
Figure 15B:
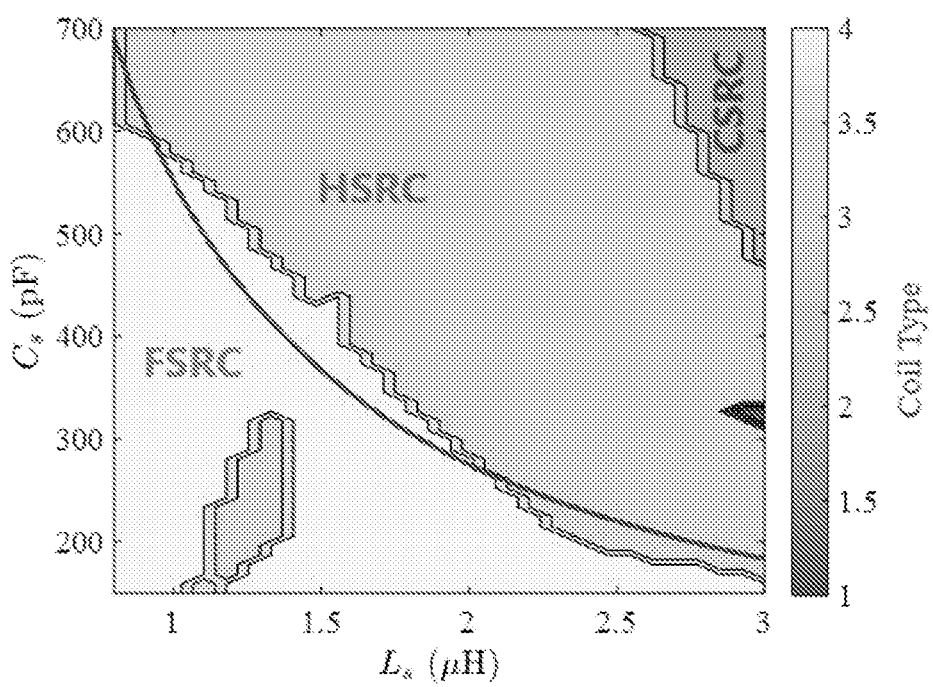
FIG. 15B shows the corresponding type of coil.

Combining the four coils, the resulting LCR design space is shown in FIG. 15A only showing the minimum ESR. The type of coil is shown in FIG. 15B. Number 1 to 4 represents SC, CSRC, HSRC, and FSRC.

Figure 16:
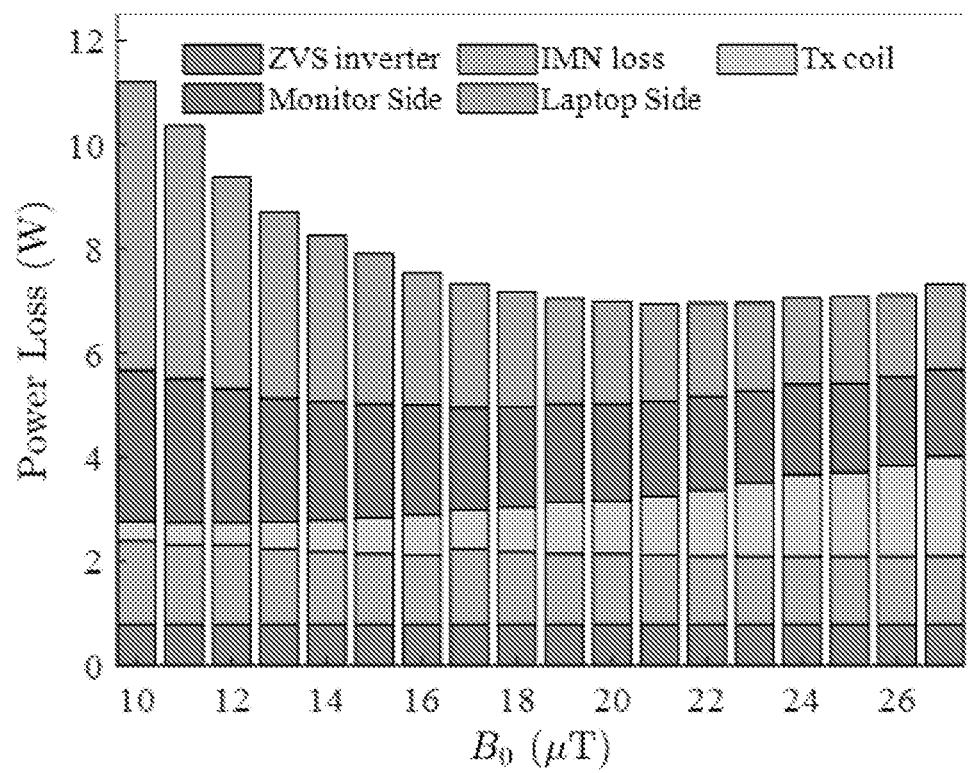
FIG. 16 is a diagram illustrating systematic design showing loss breakdown of individual voltages.

The complete coil performance capabilities shown in FIG. 15A are integrated into a multi-receiver system. The complete end-to-end system-level design result showing the power loss on every individual stage is shown in FIG. 16, which follows a similar trend as found when thicker solid-core ferriteless receivers are used for nonmetal receivers. The optimal design is $B_0=21$ µT and yields a power loss of 6.94 W when 100 W are transferred two receivers. Note that the fabricated transmitter is configured at $B_0=20$ µT and results in a close power loss of 6.99 W. The receiver will be optimized for $B_0=20$ µT considering the tiny difference to the optimal point.

The design result for the metal-body laptop receiver are: $L_s=1.6$ µH, $C_s=360$ pF, ESR=0.18Ω, and $V_o=31.5$ V. The target $V_o$ is 31.5 V. The receiver coil structure is selected to be FSRC, with $l_{ri}=5.47$ cm, $l_{ro}=8.89$ cm, $w_r=1.23$ mm, and $n_r=2$.

Simulation and Experimental Verification
FEA Simulation Result

Figure 17:
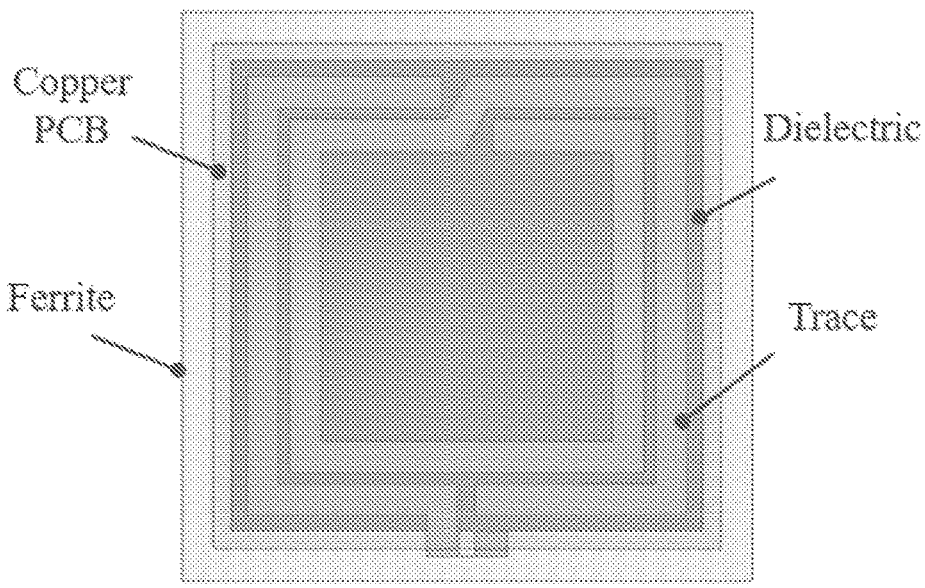
FIG. 17 is an HFSS simulation schematic.

The proposed coils are simulated using Ansys HFSS. The top view of the schematic in the simulation is shown in FIG. 17. The bottom layer, viewed from the bottom, appears identical to the top layer due to the symmetric structure.

Figure 18:
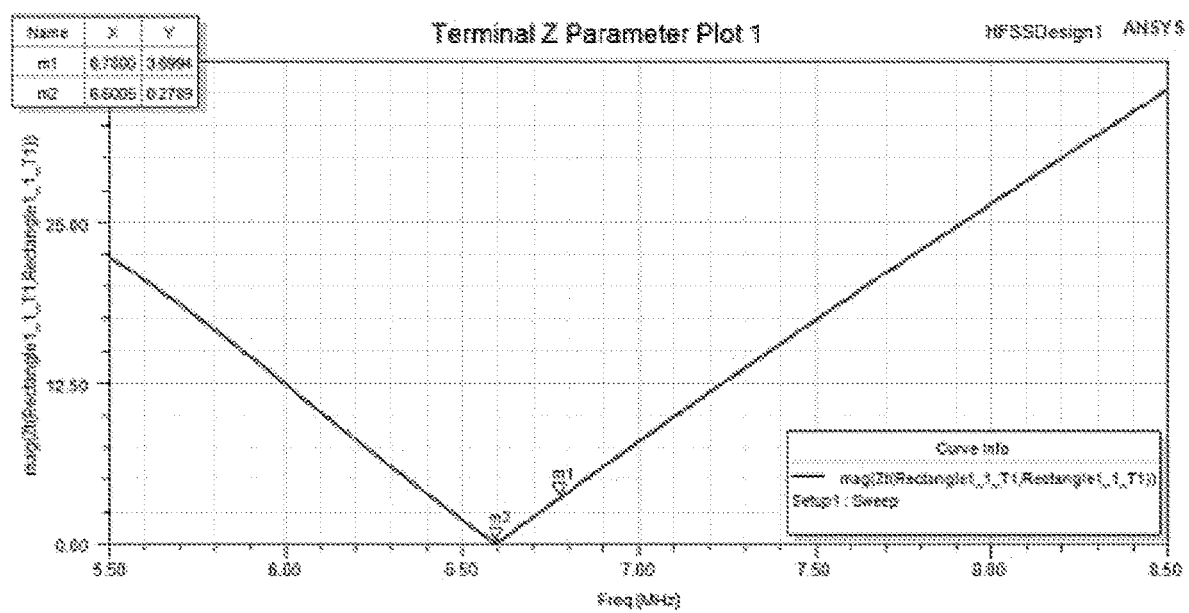
FIG. 18 is a chart for an HFSS simulation of the impedance.

The impedance curve of the FSRC coil is shown in FIG. 18 directly imported from HFSS, showing series LC resonance. The y-axis is the impedance. The x-axis is the frequency range from 5.5 to 8.5 MHz. The simulated resonant frequency is 6.60 MHz (−0.5%). Another simulation was done at 1 kHz, extracting the capacitance to be 378 pF (+5%). From the simulated resonant frequency and capacitance, the inductance is calculated to be 1.54 µH (−3.8%), illustrating the accuracy of the modeling. The FSRC coil alone, removing ferrite and copper, is also simulated. The results are summarized in FIG. 20D, Table I, showing high accuracy. The ESR measurement of FSRC with ferrite is not accurate, due to additional ferrite loss which is not modeled.

In addition to the two-turn rectangular coil that maximize system efficiency, a four-turn circular-shaped geometry is studied for both FSRC and CSRC to compared their E-field. The coil schematic and calculated longitude potential are shown in FIG. 19. Based on calculation, FSRC has a significant E-field strength reduction.

FEA simulation results are shown in FIGS. 20A-20C. FSRC has a significantly lower dielectric loss compared to CSRC, which indicates the E-field in the dielectric is reduced.

Experimental Verification

Figure 21A:
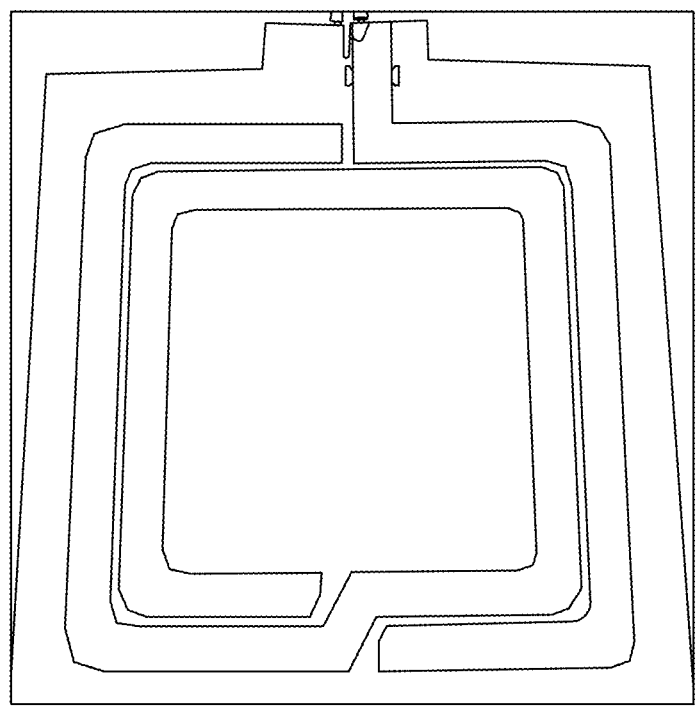
FIGS. 21A-21B show a hardware prototype and experimental setup with two receiver coils.

To verify the coil design, a FSRC is fabricated using Rogers 3003 low-loss PCB laminate, as shown in FIG. 21A. The coil impedance parameters are measured using an Agilent 4294A impedance analyzer and compared with the modeled and simulated predictions. As shown in FIG. 20D, Table I, the measurement results match well with the FEA simulation.

Figure 21B:
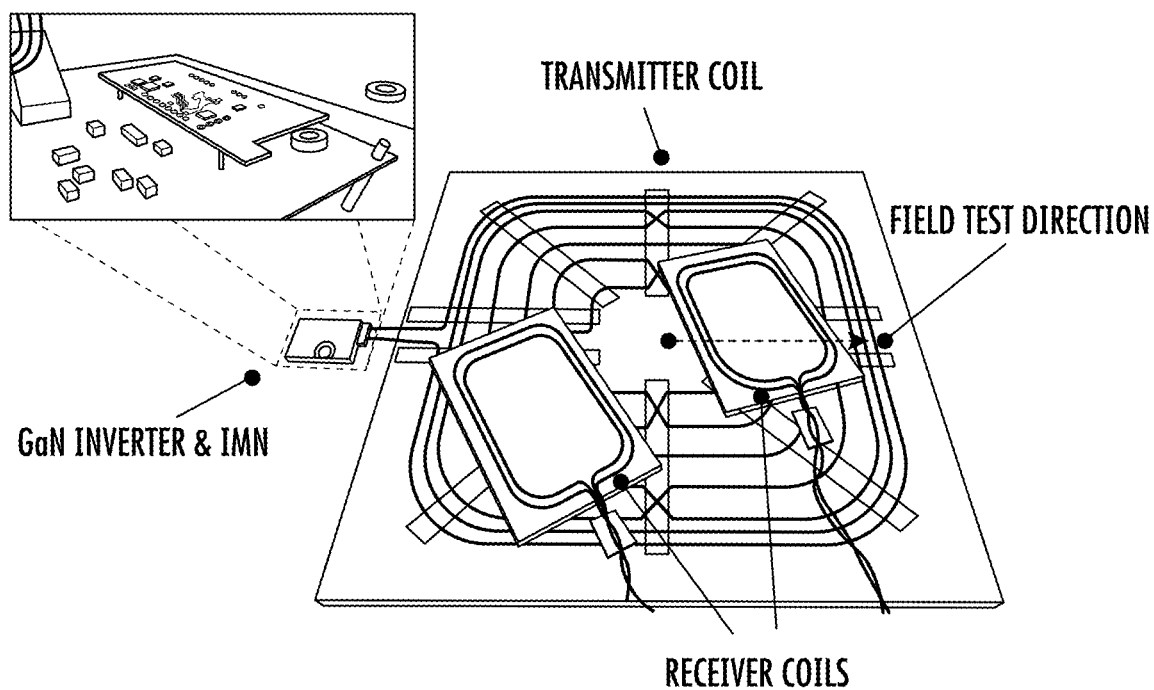

FIG. 21B presents the experimental setup, where the FSRC is implemented with the proposed rectifier and is tested with a 100 W 6.78 MHz wireless charging station as shown in FIG. 21B. The FSRC implements one 50 W receiver used to power an aluminum-body laptop, while a solid-core coil with no ferrite is used for a second 50 W receiver used to power a plastic-body computer monitor.

The system efficiency is defined as the total DC output power from all receivers divided by the transmitter side DC input power. Measured DC voltages and powers at the full load operating point are summarized in FIG. 20E, Table II, together with a comparison to the model predictions. The measured power loss is 7.94 W compared to the calculation value of 6.99, proving the accuracy of the system modeling and design. The additional loss might be caused by ferrite. The ferrite typically has a loss tangent smaller than 2%. However, no detailed modeling of how the power loss changes with B was provided to accurately quantify ferrite loss. Another possible reason is that the ferrite increases FSRC coil ESR, as shown in the simulation.

Figure 22:
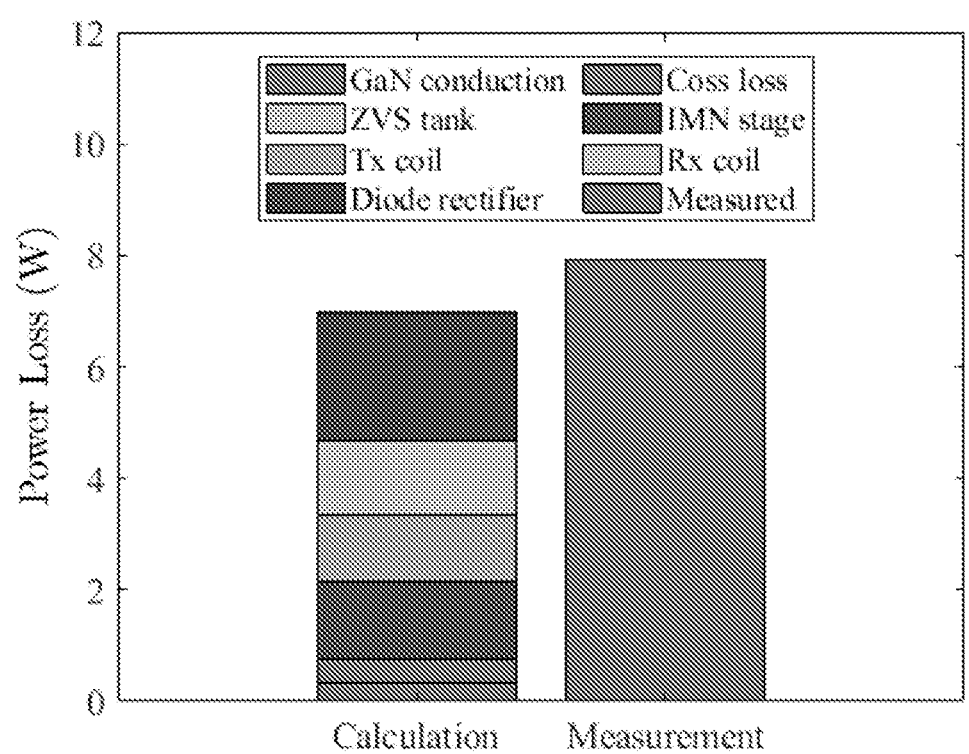
FIG. 22 is a bar chart illustrating calculated loss components contributing to the total conversion losses of the prototype system at near 100 W output power.

The measured system efficiency is 92.7%. The loss breakdown at this operating point is shown in FIG. 22.

CONCLUSION

This document describes a self-resonant coil design for WPT charging of mobile electronics such as a laptop. The structure achieves a high-Q, low E-field, and thin profile. The design results are verified experimentally for the proposed FSRC. The systematic design of a multi-receiver system wirelessly charging both a laptop and computer monitor is detailed and a complete prototype of the FSRC is experimentally shown to achieve high efficiency.

It will be understood that various details of the presently disclosed subject matter may be changed without departing from the scope of the presently disclosed subject matter. Furthermore, the foregoing description is for the purpose of illustration only, and not for the purpose of limitation.

REFERENCES

[1] J. Li, R. Qin, J. Sun, and D. Costinett, "Systematic design of a 100 W 6.78-MHz wireless charging station covering multiple devices and a large charging area," *IEEE Transactions on Power Electronics*, vol. 37, no. 4, pp. 4877-4889, 2022.

[2] N. S. Jeong and F. Carobolante, "Wireless charging of a metal-body device," *IEEE Transactions on Microwave Theory and Techniques*, vol. 65, no. 4, pp. 1077-1086, 2017.

[3] J. H. Kim and C.-H. Ahn, "Method to reduce metal plate effect between transmitter and receiver in wireless power transfer system," *IEEE Antennas and Wireless Propagation Letters*, vol. 17, no. 4, pp. 587-590, 2018.

[4] N. S. Jeong, S. Kim, H.-J. Lee, and J. H. Kim, "Wireless charging of a metal-encased device," *IEEE Transactions on Antennas and Propagation*, vol. 70, no. 1, pp. 654-663, 2022.

[5] S. Yang, J. Narayan, J. Rosenfeld, K. Stevens, and P. Chewning, "Chassis design for wireless-charging coil integration for computing systems," U.S. patent Ser. No. 10/003,218B2, Dec. 20, 2014.

[6] S. Yang, E. B. Cooper, E. Elkhouly, J. K. Narayan, and S. Ren, "Low emission coil topology for wireless charging," United Kingdom Patent GB2533695A, Nov. 23, 2015.

[7] A. L. F. Stein, P. A. Kyaw, and C. R. Sullivan, "High-Q self-resonant structure for wireless power transfer," pp. 3723-3729, 2017.

[8] J. Li and D. Costinett, "Analysis and design of a series self-resonant coil for wireless power transfer," in 2018 *IEEE Applied Power Electronics Conference and Exposition (APEC)*. IEEE, 2018, pp. 1052-1059.

[9] R. Qin, J. Li, and D. Costinett, "A 6.6-kw high-frequency wireless power transfer system for electric vehicle charging using multilayer nonuniform self-resonant coil at mhz," *IEEE Transactions on Power Electronics*, vol. 37, no. 4, pp. 4842-4856, 2022.

[10] S. S. Mohan, M. del Mar Hershenson, S. P. Boyd, and T. H. Lee, "Simple accurate expressions for planar spiral inductances," *IEEE Journal of Solid-State Circuits*, vol. 34, no. 10, pp. 1419-1424, 1999.

[11] C. R. Sullivan and L. Beghou, "Design methodology for a high-Q self-resonant coil for medical and wireless-power applications," in *14th Workshop on Control and Modeling for Power Electronics (COMPEL)*. IEEE, 2013, pp. 1-8.

[12] Ferrite Shield DataSheet, Wurth" Elektronik. [Online]. Available: https://www.we-online.com/katalog/datasheet/364003.pdf

[13] P. C. F. Chan, C. K. Lee, and S. Y. R. Hui, "Stray capacitance calculation of coreless planar transformers including fringing effects," *Electronics Letters*, vol. 43, no. 23, p. 1308, 2007.

What is claimed is:

1. A series self-resonant coil structure for wireless power transfer, the coil structure comprising:
   a first conductive layer configured in a first planar spiral arrangement, the first conductive layer comprising a first terminal;
   a second conductive layer configured in a second planar spiral arrangement, the second conductive layer comprising a second terminal; and
   a dielectric layer positioned between the first conductive layer and the second conductive layer;
   wherein the first conductive layer, the second conductive layer, and the dielectric layer are configured to produce a repeated serial LC connection between the first terminal and the second terminal; and
   wherein the first conductive layer comprises at least one discontinuity and the second conductive layer is continuous at the location of the at least one discontinuity mirrored about the dielectric layer.

2. The coil structure of claim 1, comprising a plurality of parasitic capacitors connected to the first conductive layer and to the second conductive layer and configured to compensate the voltage potential of one or more portion of the first planar spiral arrangement and the second planar spiral arrangement.

3. The coil structure of claim 2, wherein the plurality of parasitic capacitors are positioned at alternating turns of the first conductive layer and of the second conductive layer.

4. The coil structure of claim 2, wherein the plurality of parasitic capacitors are positioned at each half turn of the first conductive layer and the second conductive layer.

5. The coil structure of claim 1, wherein the first conductive layer and the second conductive layer comprise interleaved symmetric structures.

6. The coil structure of claim 1, comprising:
   one or more additional conductive layer configured in a planar spiral arrangement; and
   one or more additional dielectric layers positioned between the one or more additional conductive layer and an adjacent conductive layer.

7. The coil structure of claim 1, comprising a ferrite shield arranged on a side of the first conductive layer opposite the dielectric layer, the ferrite shield being configured to protect magnetic coupling and reduce interference with neighboring objects.

8. The coil structure of claim 1, comprising an alternating current source connected to the first terminal and the second terminal.

9. A system for wireless power transfer, the system comprising:
   a power source;
   a transmitter coil; and
   a control circuit configured for wirelessly supplying power to a receiving device by applying power from the power source to the transmitter coil;
   wherein the transmitter coil comprises a series self-resonant coil structure comprising:
      a first conductive layer configured in a first planar spiral arrangement, the first conductive layer comprising a first terminal;
      a second conductive layer configured in a second planar spiral arrangement, the second conductive layer comprising a second terminal; and
      a dielectric layer positioned between the first conductive layer and the second conductive layer;
   wherein the first conductive layer, the second conductive layer, and the dielectric layer are configured to produce a repeated serial LC connection between the first terminal and the second terminal; and
   wherein the first conductive layer comprises at least one discontinuity and the second conductive layer is continuous at the location of the at least one discontinuity mirrored about the dielectric layer.

10. The system of claim 9, comprising a plurality of parasitic capacitors connected to the first conductive layer and to the second conductive layer and configured to compensate the voltage potential of one or more portion of the first planar spiral arrangement and the second planar spiral arrangement.

11. The system of claim 10, wherein the plurality of parasitic capacitors are positioned at alternating turns of the first conductive layer and of the second conductive layer.

12. The system of claim 10, wherein the plurality of parasitic capacitors are positioned at each half turn of the first conductive layer and the second conductive layer.

13. The system of claim 9, wherein the first conductive layer and the second conductive layer comprise interleaved symmetric structures.

14. The system of claim 9, comprising:
   one or more additional conductive layer configured in a planar spiral arrangement; and
   one or more additional dielectric layers positioned between the one or more additional conductive layer and an adjacent conductive layer.

15. The system of claim 9, comprising a ferrite shield arranged on a side of the first conductive layer opposite the dielectric layer, the ferrite shield being configured to protect magnetic coupling and reduce interference with neighboring objects.

16. The system of claim 9, wherein the power source comprises an alternating current source connected to the first terminal and the second terminal.

17. A method for wireless power transfer, the method comprising:
- detecting initiation of wireless power transfer to a receiving device; and
- applying power from a power source to a transmitter coil, wherein the transmitter coil comprises a series self-resonant coil structure comprising:
  - a first conductive layer configured in a first planar spiral arrangement, the first conductive layer comprising a first terminal;
  - a second conductive layer configured in a second planar spiral arrangement, the second conductive layer comprising a second terminal; and
  - a dielectric layer positioned between the first conductive layer and the second conductive layer;
- wherein the first conductive layer, the second conductive layer, and the dielectric layer are configured to produce a repeated serial LC connection between the first terminal and the second terminal; and
- wherein the first conductive layer comprises at least one discontinuity and the second conductive layer is continuous at the location of the at least one discontinuity mirrored about the dielectric layer.

18. The method of claim 17, wherein transmitter coil comprises a plurality of parasitic capacitors connected to the first conductive layer and to the second conductive layer and configured to compensate the voltage potential of one or more portion of the first planar spiral arrangement and the second planar spiral arrangement.

19. The method of claim 18, wherein the plurality of parasitic capacitors are positioned at alternating turns of the first conductive layer and of the second conductive layer.

20. The method of claim 18, wherein the plurality of parasitic capacitors are positioned at each half turn of the first conductive layer and the second conductive layer.

* * * * *